United States Patent
van Hoytema

(10) Patent No.: US 12,281,748 B1
(45) Date of Patent: *Apr. 22, 2025

(54) MODULAR RIGGING SYSTEM USING HEXAGONAL SUPPORT PIECES

(71) Applicant: Furious People, Beverly Hills, CA (US)

(72) Inventor: Hoyte van Hoytema, Los Angeles, CA (US)

(73) Assignee: Furious People, Beverly Hills, CA (US)

( * ) Notice: Subject to any disclaimer, the term of this patent is extended or adjusted under 35 U.S.C. 154(b) by 1007 days.

This patent is subject to a terminal disclaimer.

(21) Appl. No.: 17/233,408

(22) Filed: Apr. 16, 2021

Related U.S. Application Data

(63) Continuation of application No. 16/288,552, filed on Feb. 28, 2019, now Pat. No. 11,022,251, which is a continuation-in-part of application No. 29/675,062, filed on Dec. 28, 2018, now Pat. No. Des. 874,680, and a continuation-in-part of application No. 15/842,462, filed on Dec. 14, 2017, now Pat. No. 10,465,395, said application No. 29/675,062 is a continuation-in-part of application No. 15/842,462, filed on Dec. 14, 2017, now Pat. No. 10,465,395, and a continuation-in-part of application No. 29/589,668, filed on Jan. 4, 2017, now Pat. No. Des. 850,655, said application No. 16/288,552 is a continuation-in-part of application No. 29/589,668, filed on Jan. 4, 2017, now Pat. No. Des. 850,655.

(Continued)

(51) Int. Cl.
*F16M 13/02* (2006.01)
*E04G 5/00* (2006.01)
*A47B 13/00* (2006.01)
*B62B 3/02* (2006.01)
*E04G 1/24* (2006.01)
*F21V 21/00* (2006.01)

(52) U.S. Cl.
CPC ............... *F16M 13/02* (2013.01); *E04G 5/00* (2013.01); *A47B 13/00* (2013.01); *B62B 3/02* (2013.01); *E04G 1/24* (2013.01); *F21V 21/00* (2013.01)

(58) Field of Classification Search
None
See application file for complete search history.

(56) References Cited

U.S. PATENT DOCUMENTS 3,385,545 A  5/1968  Patton
3,877,170 A  4/1975  Bakker
(Continued)

*Primary Examiner* — James M Ference
(74) *Attorney, Agent, or Firm* — Amster, Rothstein & Ebenstein LLP

(57) ABSTRACT

A rigging system including a first hexagonal support piece that includes six side members, six rod clamps each configured to hold a rod piece and connecting two neighboring side members, each rod clamp including a gap open to outward from the first hexagonal support piece, a latch to close the gap to hold the rod piece within the gap, a set screw hole for a set screw to be inserted to tighten the latch, and a rear hole for a screw or a bolt to be inserted toward the center of the first hexagonal support piece, and at least one side hole, a first set screw configured to fit within a cross-section of the set screw hole, and a first connection bolt to fit within a cross-section of the at least one side hole.

9 Claims, 35 Drawing Sheets

Related U.S. Application Data

(60) Provisional application No. 62/792,647, filed on Jan. 15, 2019, provisional application No. 62/434,801, filed on Dec. 15, 2016.

(56) References Cited

U.S. PATENT DOCUMENTS

| | | | |
|---|---|---|---|
| 3,945,600 A * | 3/1976 | Mallwitz | F16M 11/22 |
| | | | 403/177 |
| 4,253,268 A | 3/1981 | Mayr | |
| 4,566,819 A | 1/1986 | Johnston | |
| 4,632,221 A | 12/1986 | Standord | |
| 5,017,038 A | 5/1991 | Kurosaki | |
| 5,427,465 A | 6/1995 | Sato | |
| 5,828,502 A * | 10/1998 | Afshari | G01M 11/04 |
| | | | 359/822 |
| 6,264,522 B1 | 7/2001 | Dickson | |
| 7,510,457 B2 | 3/2009 | Hussa-Lietz | |
| 7,922,159 B2 * | 4/2011 | Troxler | B23H 11/003 |
| | | | 269/155 |
| 8,033,537 B2 * | 10/2011 | Wuethrich | F16B 5/02 |
| | | | 446/124 |
| 8,162,557 B2 | 4/2012 | van Zile, III et al. | |
| 8,480,449 B2 | 7/2013 | Cheng | |
| D691,873 S | 10/2013 | Ganski | |
| 8,782,965 B2 | 7/2014 | Hava | |
| 9,345,983 B2 | 5/2016 | Meys | |
| 9,427,675 B2 | 8/2016 | Yang | |
| D796,066 S | 8/2017 | Shell | |
| D822,122 S | 7/2018 | Bilezikian et al. | |
| 2003/0129919 A1 | 7/2003 | Glickman | |
| 2005/0205722 A1 | 9/2005 | Krueger | |
| 2009/0239712 A1 | 9/2009 | Van Raalte et al. | |
| 2012/0074524 A1 | 3/2012 | Baker | |
| 2016/0033075 A1 * | 2/2016 | Smith | B01L 9/50 |
| | | | 248/558 |
| 2017/0082820 A1 * | 3/2017 | Jin | G02B 7/023 |
| 2017/0191611 A1 * | 7/2017 | Nguyen | G02B 7/003 |
| 2018/0238487 A1 | 8/2018 | Smith et al. | |

* cited by examiner

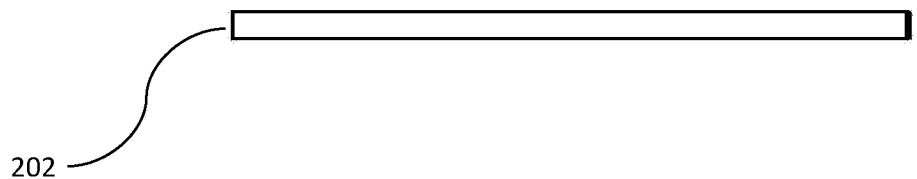
202
FIG. 2A
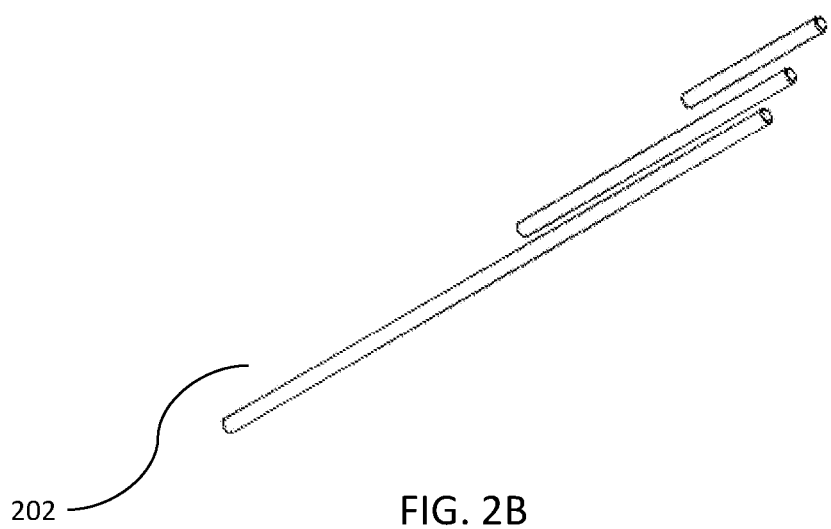
202    FIG. 2B
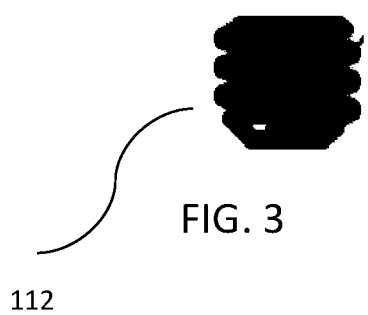
FIG. 3
112
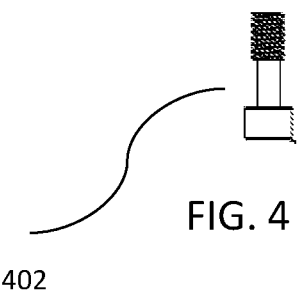
FIG. 4
402

MODULAR RIGGING SYSTEM USING HEXAGONAL SUPPORT PIECES

CROSS-REFERENCE TO RELATED APPLICATION

This application is a continuation of U.S. patent application Ser. No. 16/288,552, filed on Feb. 28, 2019, which claims the benefit of and priority to U.S. Provisional Patent Application No. 62/792,647, filed on Jan. 15, 2019, the contents of which are incorporated by reference herein in their entirety.

U.S. patent application Ser. No. 16/288,552 is also a continuation-in-part of U.S. patent application Ser. No. 15/842,462, filed on Dec. 14, 2017, which claims the benefit of and priority to U.S. Provisional Patent Application No. 62/434,801, filed on Dec. 15, 2016, the contents of all of which are incorporated by reference herein in their entirety.

U.S. patent application Ser. No. 16/288,552 is also a continuation-in-part of U.S. Design patent application Ser. No. 29/675,062, filed on Dec. 28, 2018, which is a continuation-in-part of U.S. Design patent application Ser. No. 29/589,668, filed on Jan. 4, 2017, and also a continuation-in-part of U.S. patent application Ser. No. 15/842,462, filed on Dec. 14, 2017, which claims the benefit of and priority to U.S. Provisional Patent Application No. 62/434,801, filed on Dec. 15, 2016, the contents of all of which are incorporated by reference herein in their entirety.

U.S. patent application Ser. No. 16/288,552 is also a continuation-in-part of U.S. Design patent application Ser. No. 29/589,668, filed on Jan. 4, 2017, the contents of which are incorporated by reference herein in their entirety.

FIELD OF THE INVENTION

The present disclosure generally relates to rigging systems using hexagonal support pieces, and, in particular, modular rigging systems that can be used to construct and support various structures. In embodiments, the hexagonal support pieces may be connected by rods and/or bolts.

BACKGROUND OF THE INVENTION

Rigging, also referred to as staging or scaffolding, is frequently used in the construction of temporary structures. Such structures can be used on buildings during construction to support workmen and equipment both on the interior and exterior of the building. Similar temporary structures are also commonly used for rigging audio and video equipment on stages and for use in art displays.

Temporary structures are most commonly erected using "tubes" and "clamps." Specifically, in such systems, vertical tubes are connected to horizontal tubes using right angle clamps.

Conventional rigging systems consist of metal pieces that can be constructed to provide support to various structures. Conventional rigging systems use right angle joints that can be oriented in limited directions.

Furthermore, conventional systems have limited options for securing the rigging system together. These limitations further limit construction options.

However, such conventional rigging systems have many disadvantages. They are labor-intensive to construct. In addition, connections between vertical and horizontal tubes are generally limited to being made only at right angles. This limits the configurations available and the locations in which prior art rigging can be used.

Accordingly, a new type of rigging system is needed to overcome these and other problems and provide a modular, versatile and safe temporary structure.

BRIEF DESCRIPTION OF THE DRAWINGS

Exemplary embodiments of the present invention will be described with reference to the accompanying figures, wherein:

FIG. 2A. shows a front view of a rod piece 202.

FIG. 2B. shows an isometric view of three rod pieces 202.

FIG. 3 shows a front view of a set screw 112.

FIG. 4 shows a front view of a connection bolt 402.

SUMMARY OF INVENTION

Figure 1A:
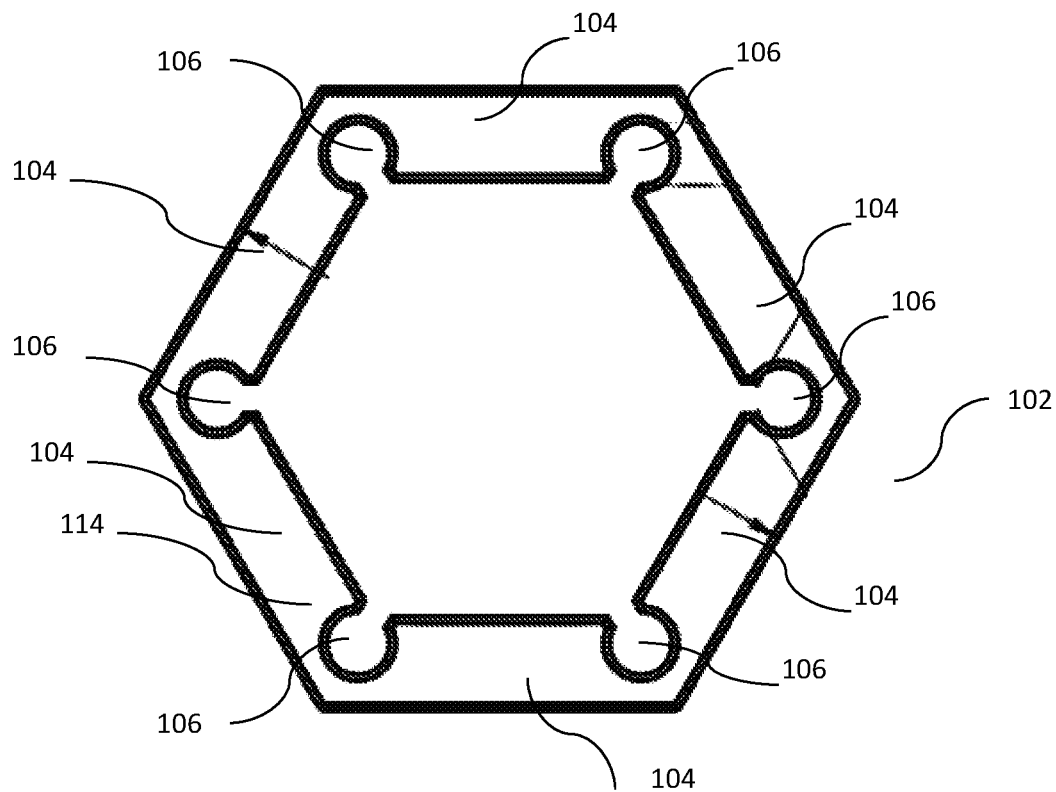
FIG. 1A shows a front view of a hexagonal support piece according to an exemplary embodiment of the invention.

The present invention generally relates to an improved modular rigging system using hexagonal support pieces and rods.

More particularly, the present invention relates to a rigging system comprising a plurality of members including a first hexagonal support piece comprising six side members, at least one rod hole, at least one side hole, and at least one set screw hole; a first rod piece that has a cross-section of size and shape configured to fit closely within the cross-section of the rod holes; a first set screw that has a cross-section of size and shape configured to fit closely within the cross-section of the set screw hole; a first connection bolt that that has a cross-section of size and shape configured to fit closely within the cross-section of the side hole; with the plurality of members having a plurality of configurations providing structural support.

In embodiments, the side members are joined at equiangular configurations.

In embodiments, the set screws are threaded and the set screw holes are tapped to fit a threaded bolt.

In embodiments, the connection bolts are threaded.

In embodiments, the side holes are tapped to fit a threaded bolt.

In embodiments, the rod holes are at the corners of the hexagonal support pieces.

In embodiments, there are six rod holes in a hexagonal support piece.

In embodiments, there are side holes at the midpoints of each side of the hexagonal support piece.

In embodiments, the rod pieces have a cylindrical cross-section.

In embodiments, the rod pieces have a hexagonal cross-section.

In embodiments, the rod pieces have a rectangular cross-section.

In embodiments, the rod pieces are threaded so as to fit a nut.

In addition, the present invention also relates to a rigging system comprising a plurality of members including: a first hexagonal support piece comprising: six side members, six rod clamps, each one of the rod clamps being configured to receive and hold a rod piece and positioned between and connecting two neighboring ones of the side members, the each one of the rod clamps comprising: a gap open to outward from a center of the first hexagonal support piece, a latch configured to close the gap at least in part to hold the rod piece within the gap, a set screw hole configured for a set screw to be inserted to tighten the latch, and a rear hole configured for a screw or a bolt to be inserted toward the center of the first hexagonal support piece, and at least one side hole; a first set screw having a cross-section of size and shape configured to fit closely within a cross-section of the set screw hole; and a first connection bolt having a cross-section of size and shape configured to fit closely within a cross-section of the at least one side hole, wherein the plurality of members have a plurality of configurations of structural support.

In embodiments, the side members are connected together to form an equiangular configuration.

In embodiments, the system further comprises a first rod piece having a cross-section of size and shape configured to fit closely within a cross-section of the gap closed by the latch.

In embodiments, the first set screw is threaded.

In embodiments, the first connection bolt is threaded.

In embodiments, the at least one side hole is tapped to fit a threaded bolt.

In embodiments, the each one of the rod clamps further comprises a substantially semi-cylindrical surface surrounding the gap.

In embodiments, the at least one side hole is positioned at a midpoint of one of the side members.

In embodiments, the first rod piece has a cylindrical cross-section.

In embodiments, the first rod piece has a hexagonal cross-section.

In embodiments, the first rod piece has a rectangular cross-section.

In embodiments, the first rod piece is threaded so as to fit a nut.

In embodiments, the at least one rod clamp further comprises a hole configured for a screw or a bolt to be inserted toward the center of the first hexagonal support piece.

In embodiments, each side member includes a planar outer surface.

In embodiments, each side member includes a planar inner surface.

DETAILED DESCRIPTIONS OF THE INVENTION

The present invention generally relates to modular rigging systems comprising hexagonal support pieces. The advantage of making this invention modular is that the rigging system is easily constructed and deconstructed in various orientations using interchangeable pieces.

In embodiments, a rigging system may be used to temporarily support workmen and equipment during construction. In embodiments, a rigging system may be used to support audio and video equipment on and around stages during musical and theatrical performance. Furthermore, in embodiments, a rigging system may be used in the construction and support of sets.

The inventive modular rigging systems will now be described with reference to exemplary embodiments as illustrated in FIGS. 1A-13.

Figure 1B:
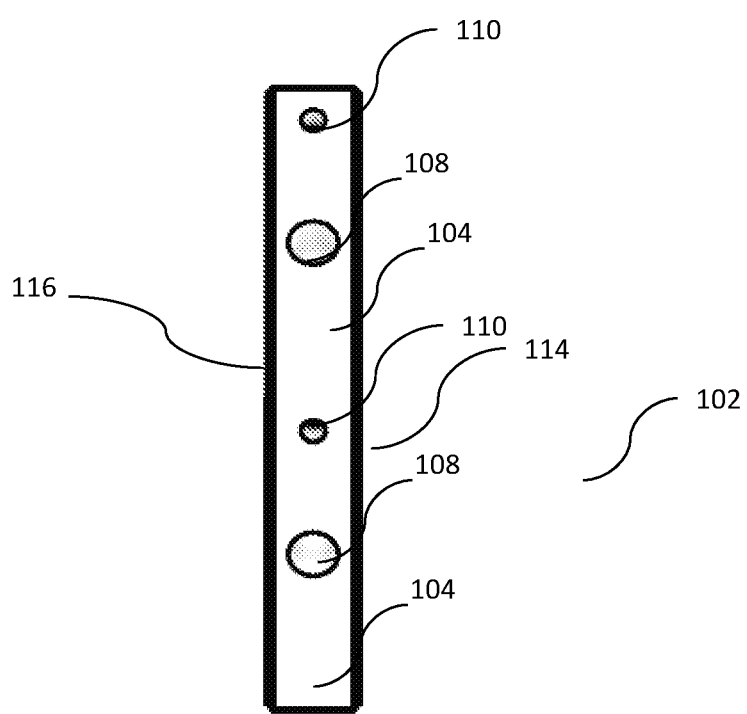
FIG. 1B shows a side view of a hexagonal support piece according to an exemplary embodiment of the invention.
Figure 1C:
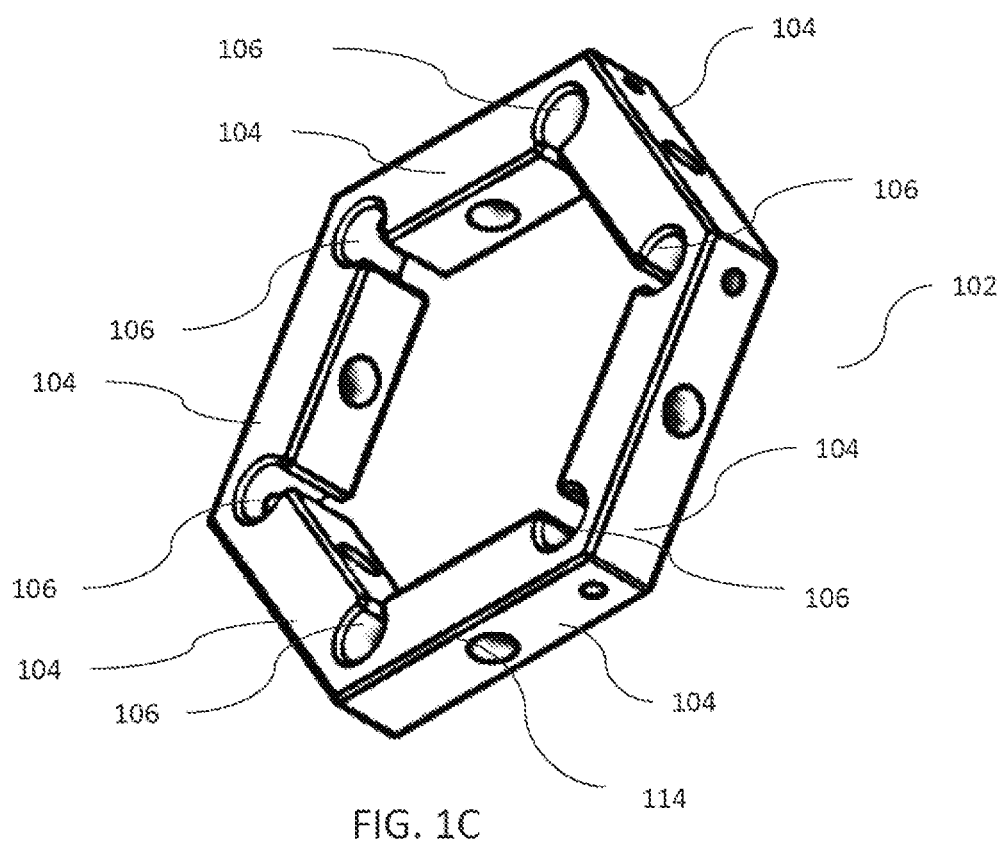
FIG. 1C shows an isometric view of a hexagonal support piece according to an exemplary embodiment of the invention.

FIGS. 1A-C show different views of a hexagonal support piece 102 in accordance with embodiments of the present invention. FIG. 1A shows a front view, FIG. 1B shows a side view, and FIG. 1C shows an isometric view of the hexagonal support piece 102.

As shown in FIGS. 1A-C, hexagonal support piece 102 has six side members 104 to form a hexagonal top and bottom surface 114 and 116. In each corner, a through hole 106 is included, which is configured to receive and hold rod pieces 202. Set screw holes 110 may be further provided for set screws to hold rod pieces in place. One or more side holes 108 are included in one or more sides. The hexagonal support piece 102, can be made in a plurality of sizes to accommodate construction in different settings.

In embodiments, the hexagonal support piece 102 can be made of supportive material, including but not limited to aluminum, steel, stainless steel, rigid plastics, iron, carbon fiber, and titanium.

In embodiments, each rod hole 106 is a substantially circular shape, so as to be configured to fit rod pieces 202. In embodiments, the rod hole 106 may be partially open or fully closed. Leaving the rod holes 106 partially open has a number of benefits. One such benefit is that it enables an alternate system of securing the rods which comprises a piece pushes and fixes the rods in place from the center of the hexagon. A second such benefit is that it provides an aesthetically pleasing ornamental design.

In embodiments, the rod holes 106 are located at the joints of the side members 104. They can also be located at a plurality of locations through the side member 104. Furthermore, there can be as few as one rod hole or a plurality of rod holes.

In embodiments, each side member 104 contains a side hole 108 situated substantially centrally and a set screw hole 110 situated such that it is both perpendicular to the side member 104 and collinear with the center for rod hole 106. In embodiments, the side hole 108 is located off center on each side member 104. In embodiments, the side hole 108 has a diameter of size configured to closely fit the connection bolt 402.

The placement of connection bolts 402, enable the hexagon support pieces 102, to be oriented or rotated in a more than one direction. This structure makes the rigging modular and adds a wide assortment of orientations and uses for the rigging system. In embodiments, the side hole 108 and the set screw hole 110 may be threaded so as to connect to a screw. The threading adds additional security in fixing the pieces together, but leaving the hole unthreaded will enable the apparatus to fit with more parts.

FIG. 2A. shows a front view of a rod piece 202. FIG. 2B. shows an isometric view of three rod pieces 202. As shown in FIGS. 2A-B, the rod pieces 202, are long cylindrical shaped pieces that fit closely into the rod holes 106 of the hexagonal support pieces 102. The rod pieces 202 are shown have a circular cross section, but can have cross sections of many shapes including but not limited to triangles, squares, and hexagons. A circular cross section enables the rigging to be oriented in infinite directions, but an angled shape aids in locking the rod pieces 202 into the hexagonal supports pieces 102. In embodiments, the rod pieces can have additional holes cut in a direction perpendicular to the length of the rod that a set screw 112 can lock into. The rod piece 202, can be made in a plurality of sizes to accommodate construction in different settings.

In embodiments, the rod piece 202 can be made of supportive materials, including but not limited to aluminum, steel, stainless steel, rigid plastics, iron, carbon fiber, and titanium.

FIG. 3 shows a front view of a set screw piece 112. The set screw piece can fit into the set screw hole 110 and secures the rod piece 202 into the rod holes 106 via friction. In embodiments, the set screw piece 112 can be made of supportive materials, including but not limited to aluminum, steel, stainless steel, rigid plastics, iron, carbon fiber, and titanium. In embodiments, the set screw piece 112 has a diameter of size configured to closely fit the diameter of the set screw hole 110 in a hexagonal support piece 102.

FIG. 4 shows a front view of a connection bolt 402. As shown in FIG. 4, the connection bolt fits closely into the side hole 108 in the hexagonal support piece 102. The connection bolt 402 is able to secure together two hexagonal support pieces 102. In embodiments, the side holes 108 are threaded and the connection bolt 402 can screw into them. In embodiments, the connection bolt 402 extends beyond the side holes 108 and can be fixed with a nut or other object to hold a plurality of hexagonal support pieces 102 together. In embodiments, the connection bolt 402 can be made of supportive material, including but not limited to aluminum, steel, stainless steel, rigid plastics, iron, carbon fiber, and titanium. The connection bolt 402, can be made in a plurality of sizes to accommodate construction in different settings.

In embodiments, the connection bolt 402 has a diameter of size configured to fit closely in the diameter of the side hole 108 in a hexagonal support piece 102.

Figure 5A:
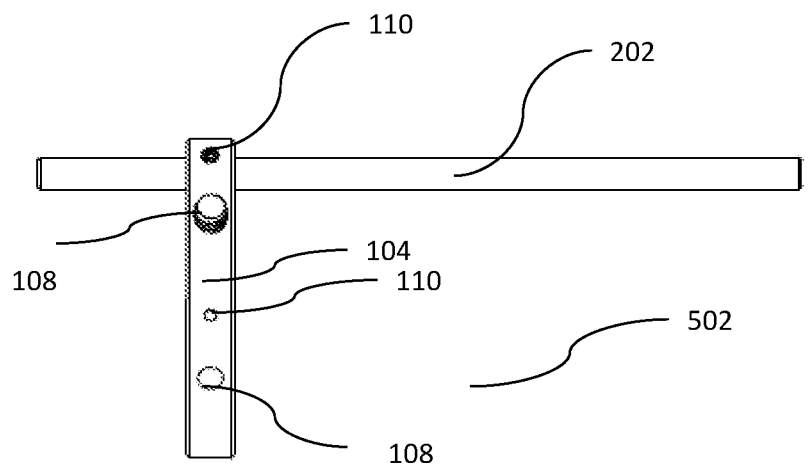
FIG. 5A shows a front view of a rigging apparatus 502.
Figure 5B:
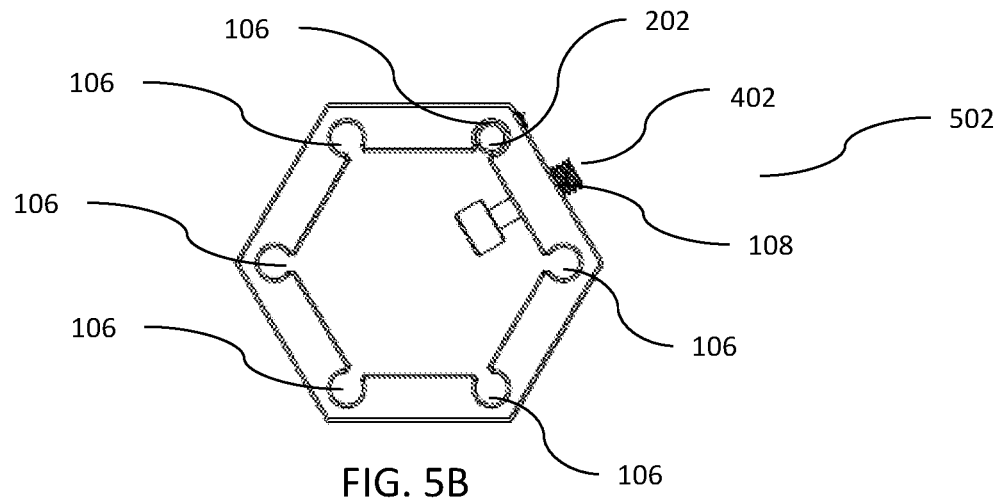
FIG. 5B shows a side view of a rigging apparatus 502.
Figure 5C:
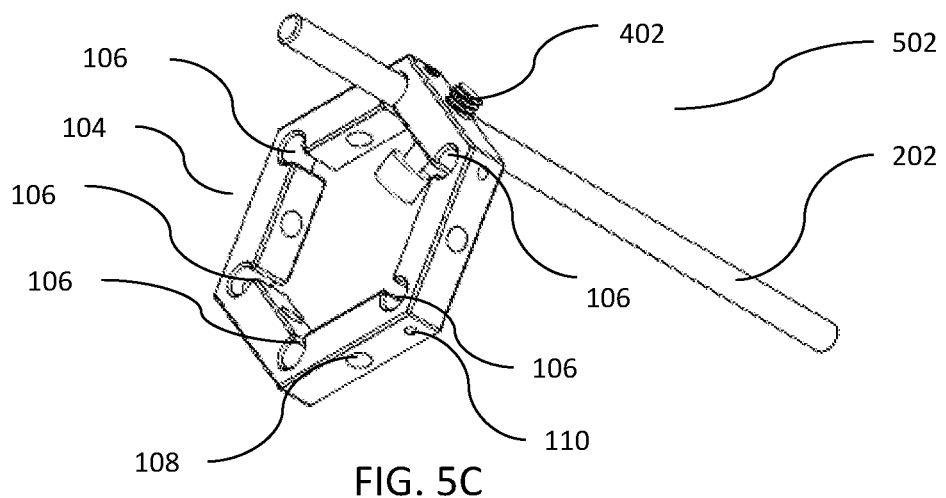
FIG. 5C shows an isometric view of a rigging apparatus 502.

FIG. 5A shows a front view of an apparatus 502, comprised of a hexagon support piece 102 and a rod 202 held in place with set screw 112. FIG. 5B shows a side view and FIG. 5C shows an isometric view of the apparatus 502. Apparatus 502 comprises a hexagonal support piece 102 with a rod piece 202 through a rod hole 106. A set screw 112 is in place in the set screw hole 110, holding the rod 202 in place. There is also a connection bolt 402 in place in the side hole 108. Apparatus 502 shows one piece of a larger configuration of the invention that can be used as a supporting structure.

Figure 6A:
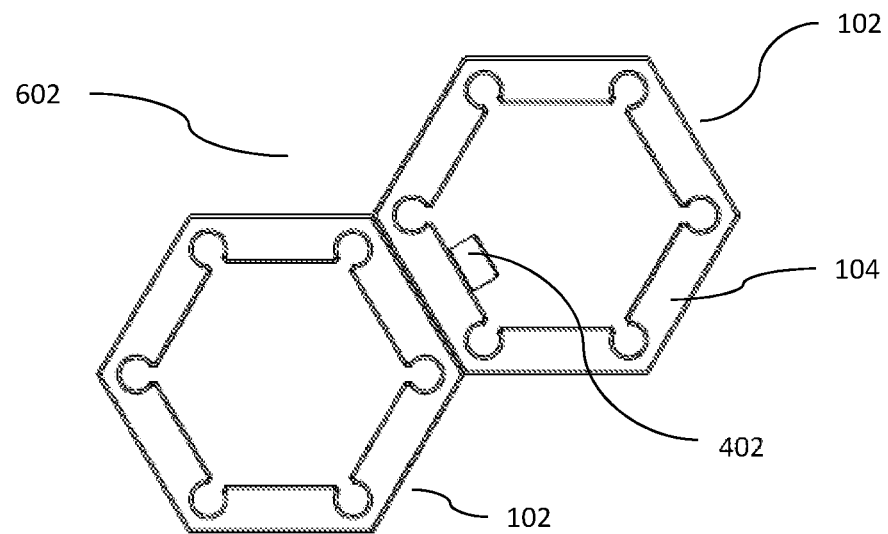
FIG. 6A shows a front view of a rigging apparatus 602.
Figure 6B:
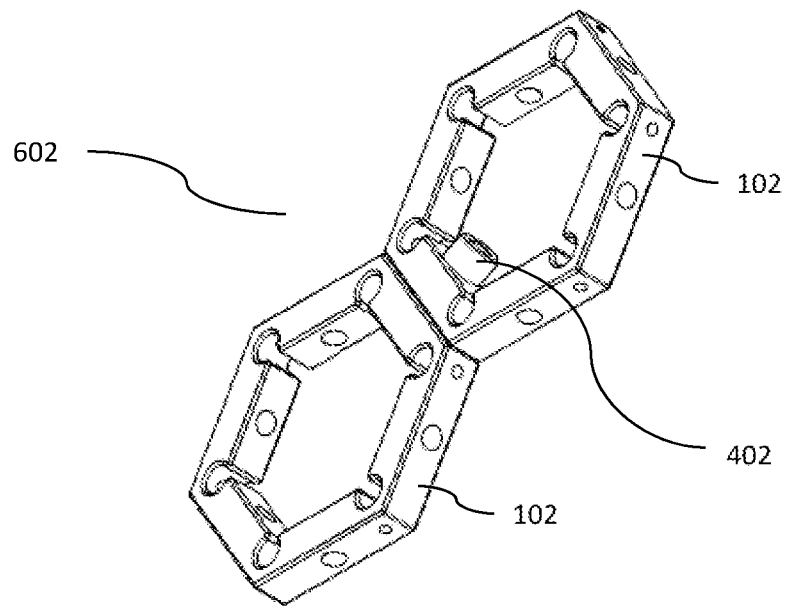
FIG. 6B shows an isometric view of a rigging apparatus 602.

FIG. 6A shows a front view of an apparatus 602. FIG. 6B shows an isometric view of an apparatus 602. The apparatus 602 comprises two hexagonal support pieces 102 connected with a connection bolt 402 in place in the side holes 108 of both hexagonal support pieces 102. This combination of a plurality of hexagonal support pieces 102 can be called a cluster. Clusters of hexagonal support pieces 102 comprise a plurality of hexagonal support pieces 102 connected while in contact. They can be oriented in a plurality of directions. The hexagonal support pieces 102, in apparatus 602, can each be turned in a full circumference, enabling the rigging to be oriented in an infinite number of directions. This adds to the possibilities of configurations and to the modular nature of the invention.

Figure 7:
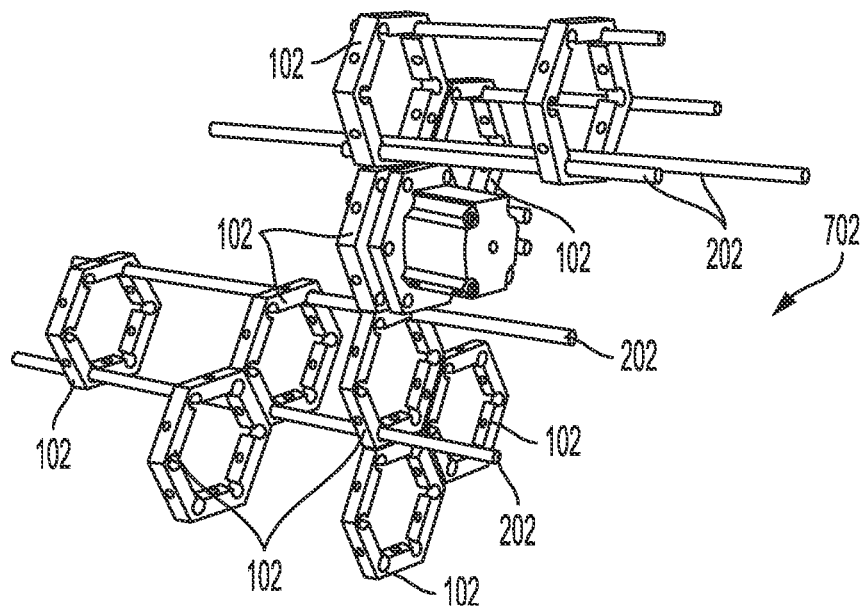
FIG. 7 shows an isometric view of a rigging apparatus 702.

FIG. 7 shows an isometric view of apparatus 702 of 10 hexagonal support pieces 102, connected by 6 rod pieces 202. This is one of a plurality of orientations and constructions that can be created using the invention. Apparatus 702 demonstrates the versatility of the invention in that in embodiments, clusters can be formed of a different number of hexagonal support pieces 102 in the same use and also that hexagonal support pieces 102 can stand alone without a cluster. The connection bolts 402 are not shown in this figure.

Figure 8:
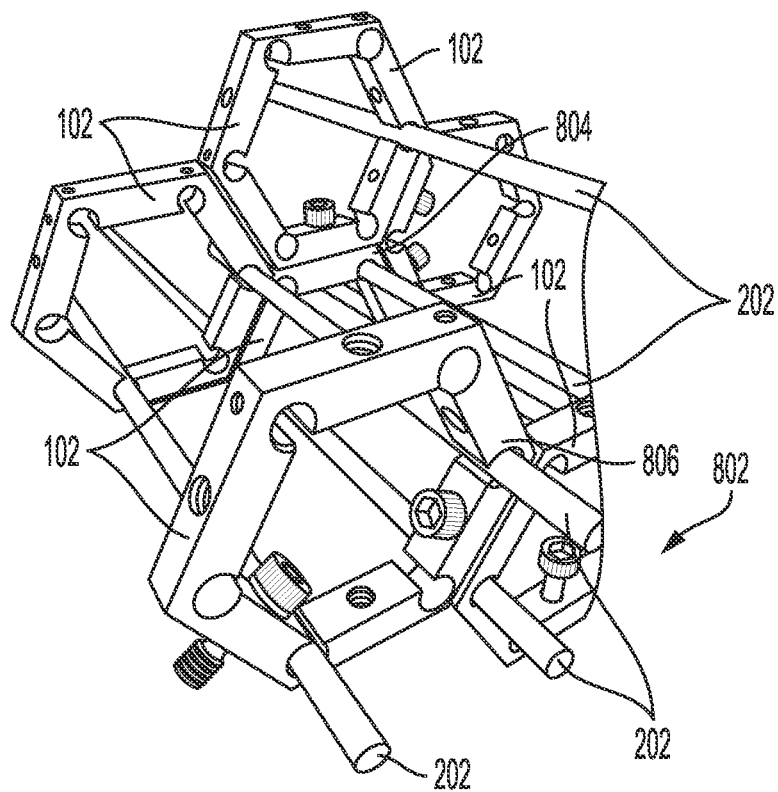
FIG. 8 shows an isometric view of a rigging apparatus 802.

FIG. 8 shows an isometric view of apparatus 802 of 5 hexagonal support pieces 102, connected by 5 rod pieces 202 and 5 connection pieces 402. This is one of a plurality of orientations and constructions that can be created using the invention. Apparatus 802 demonstrates the versatility of the invention in that it provides many configurations. Cluster 804 shows that in embodiments, four hexagonal support pieces 102 can be joined to form a cluster, whereas cluster 806 shows in embodiments, only two hexagonal support pieces need be joined to form a cluster. This variety enables the invention to be used in many different settings to support many different objects or people.

Figure 9:
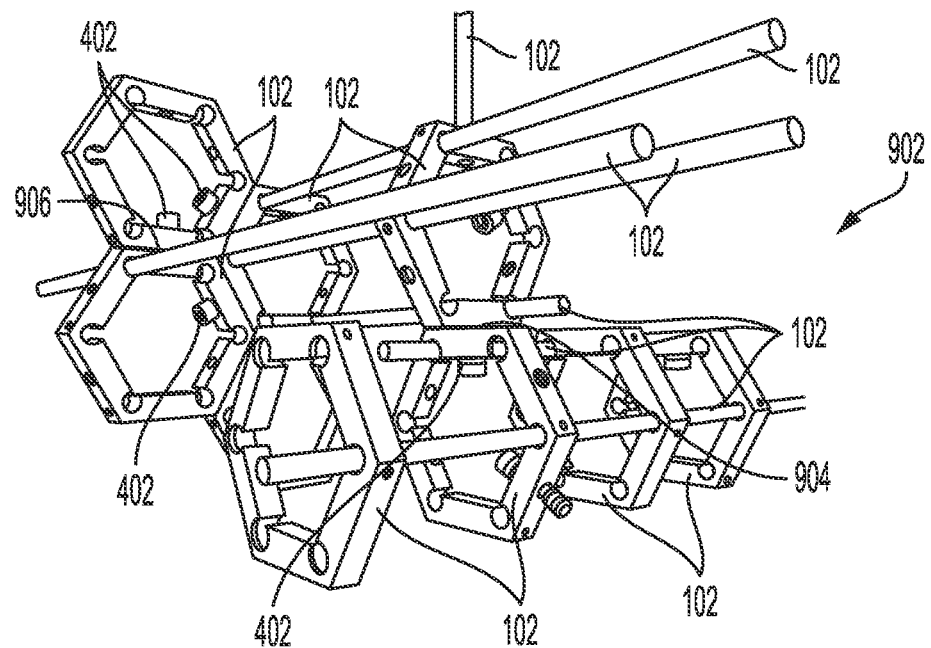
FIG. 9 shows an isometric view of a rigging apparatus 902.

FIG. 9 shows an isometric view of apparatus 902 of 8 hexagonal support pieces 102, connected by 5 rod pieces 202 and 3 connection pieces 402. Connections 904 and 906 exemplify two different angles the hexagonal support pieces 102 can be connected at. This variety of available angles enables the invention to be oriented in a plurality of directions and enables it to be used in more locations.

Figure 10:
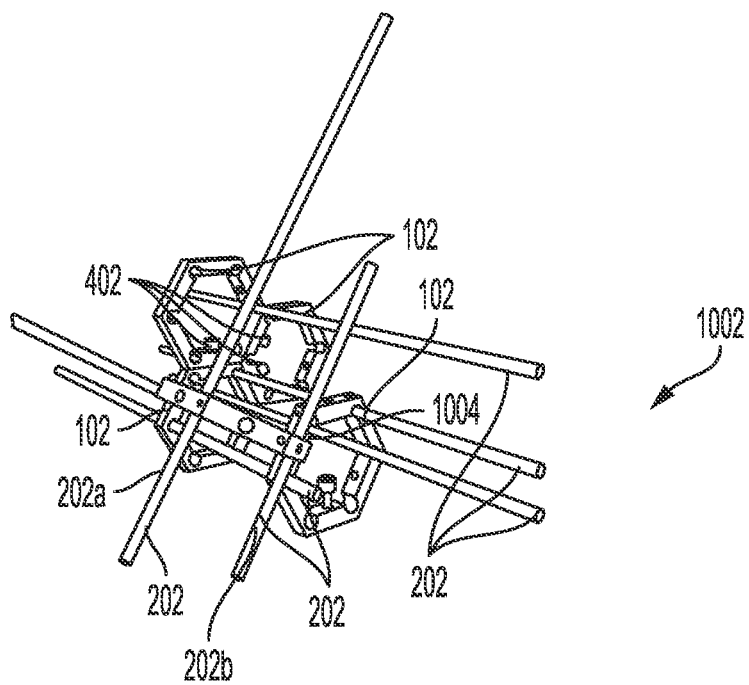
FIG. 10 shows an isometric view of a rigging apparatus 1002.

FIG. 10 shows an isometric view of apparatus 1002 of 4 hexagonal support pieces 102, connected by 5 rod pieces 202 and 3 connection pieces 402. Connection 1004 between two hexagonal support pieces 102 exemplifies an angle at which the hexagonal support pieces can be oriented. Furthermore, the angles of rods 202*a* and 202*b* with the ground exemplify that the this rigging system is not limited to orthogonal angles, which increases the possible uses and orientations it may have.

Figure 11:
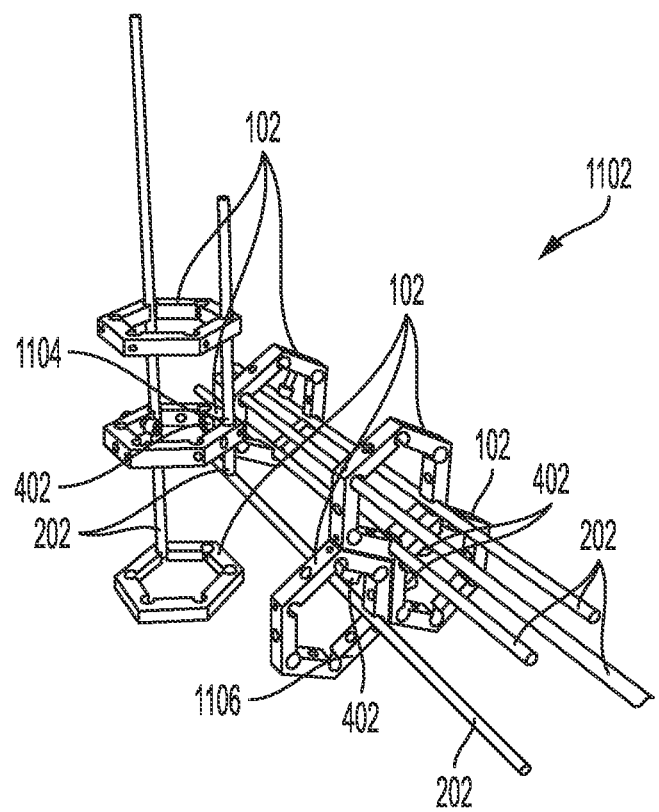
FIG. 11 shows an isometric view of a rigging apparatus 1102.

FIG. 11 shows an isometric view of apparatus 1102 of 7 hexagonal support pieces 102, connected by 6 rod pieces 202 and 4 connection pieces 402. Connections 1104 and 1106 exemplify two different angles the hexagonal support pieces 102 can be connected at. Furthermore, being able to orient the hexagonal support pieces 102 in this variety of directions enables the rod pieces 202 to also be oriented in a plurality of directions. Apparatus 1102 exemplifies the rods pieces 202 being oriented in both vertical and horizontal directions. This variety of available angles enables the invention to be oriented in a plurality of directions and enables it to be used in more locations. Cluster 1106 shows that in embodiments, three hexagonal support pieces 102 can be joined to form a cluster. This variety enables the invention to be used in many different settings to support many different objects or people.

Figure 12:
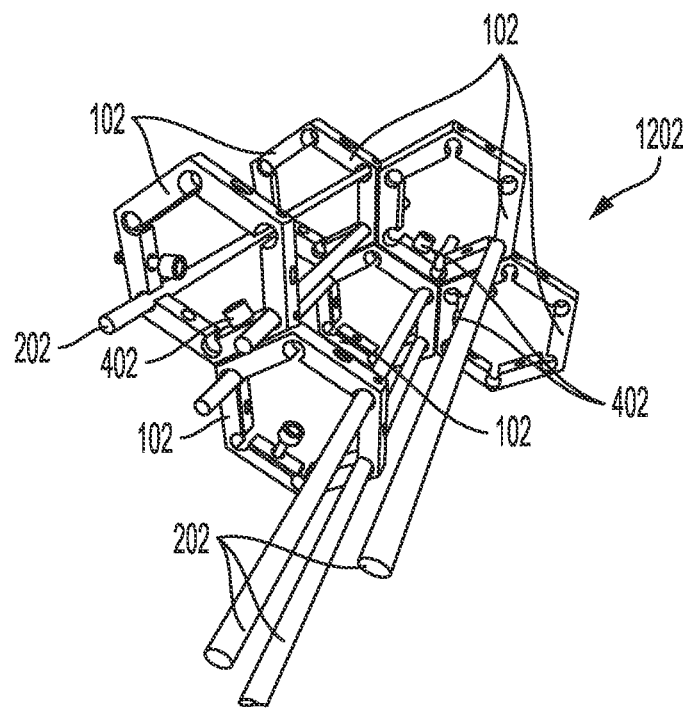
FIG. 12 shows an isometric view of a rigging apparatus 1202.

FIG. 12 shows an isometric view of apparatus 1202 of 6 hexagonal support pieces 102, connected by 7 rod pieces 202 and 4 connection pieces 402. This is one of a plurality of orientations and constructions that can be created using the invention. Apparatus 1202 demonstrates the versatility of the invention in that in embodiments, clusters can be formed of a different number of hexagonal support pieces 102 in the same use.

Figure 13:
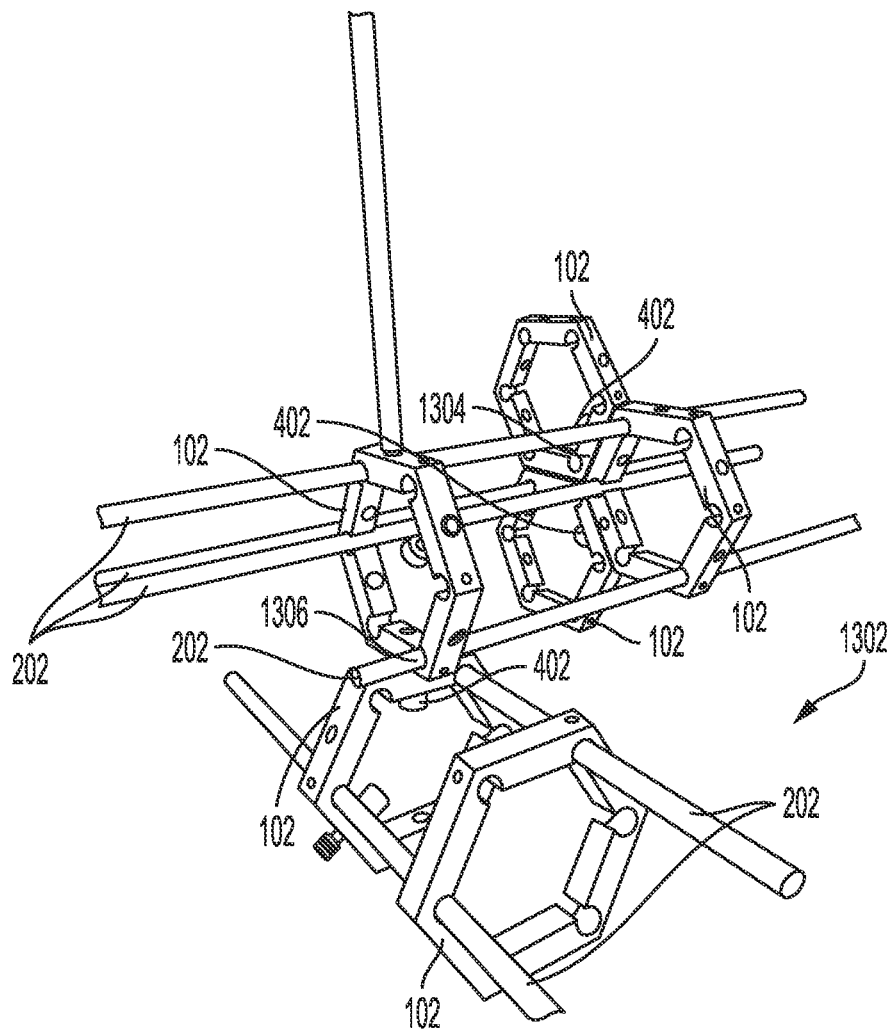
FIG. 13 shows an isometric view of a rigging apparatus 1302.

FIG. 13 shows an isometric view of apparatus 1202 of 6 hexagonal support pieces 102, connected by 6 rod pieces 202 and 4 connection pieces 402. Connections 1304 and 1306 exemplify two different angles the hexagonal support pieces 102 can be connected at. Furthermore, being able to orient the hexagonal support pieces 102 in this variety of directions enables the rod pieces 202 to also be oriented in a plurality of directions. Apparatus 1302 exemplifies the rods pieces 202 being oriented in both vertical and horizontal directions. This variety of available angles enables the invention to be oriented in a plurality of directions and enables it to be used in more locations.

Referring now to FIGS. 14-22, there are depicted exemplary embodiments of the inventive modular rigging systems.

Figure 14:
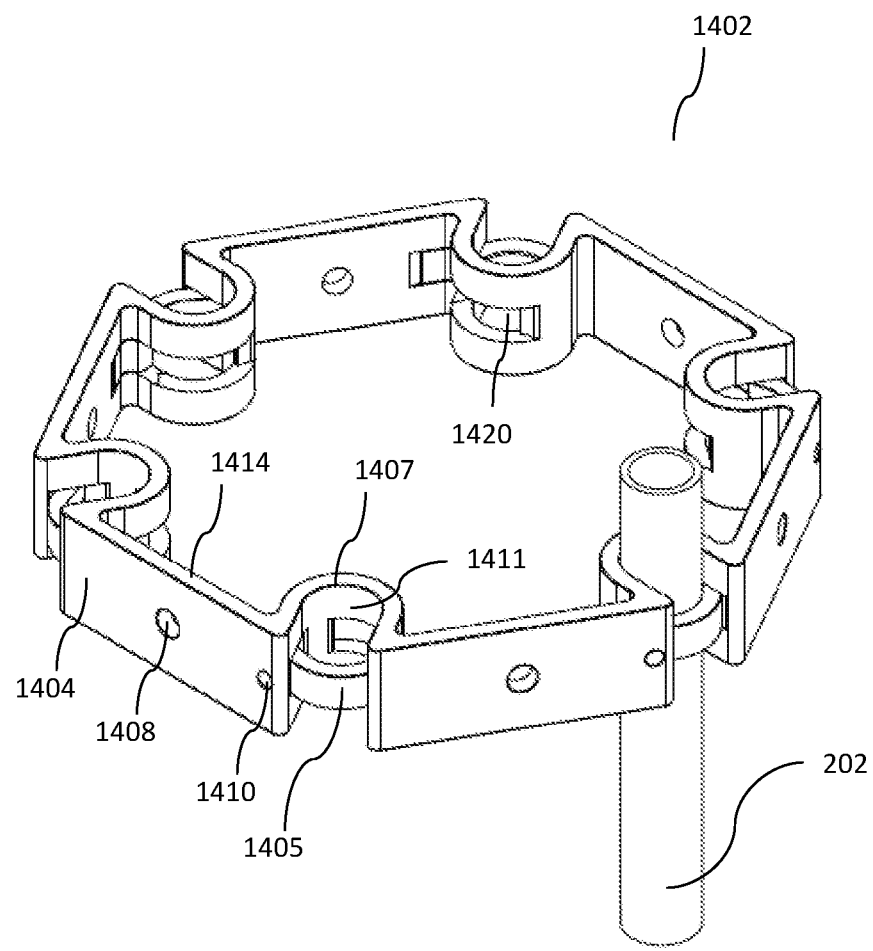
FIG. 14 shows a perspective view of a hexagonal support piece according to another exemplary embodiment of the invention.
Figure 15:
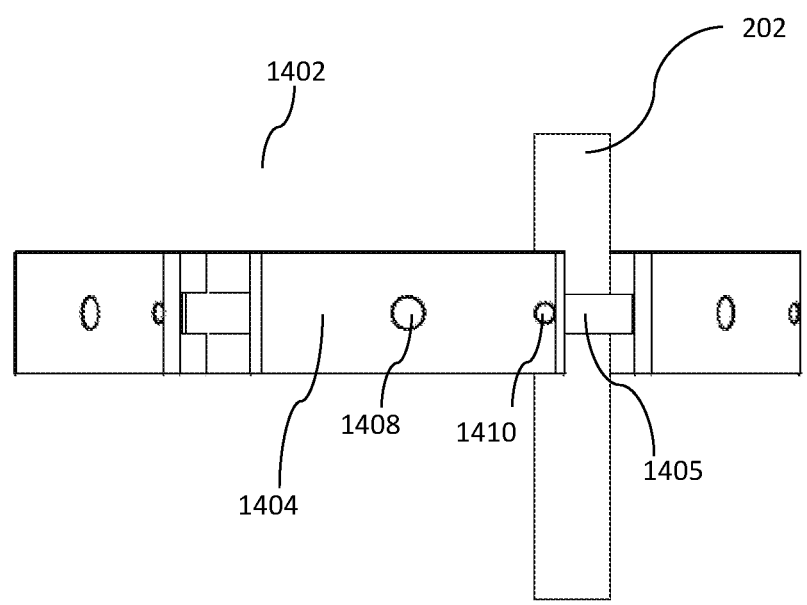
FIG. 15 is a front view of the hexagonal support piece of FIG. 14.
Figure 16:
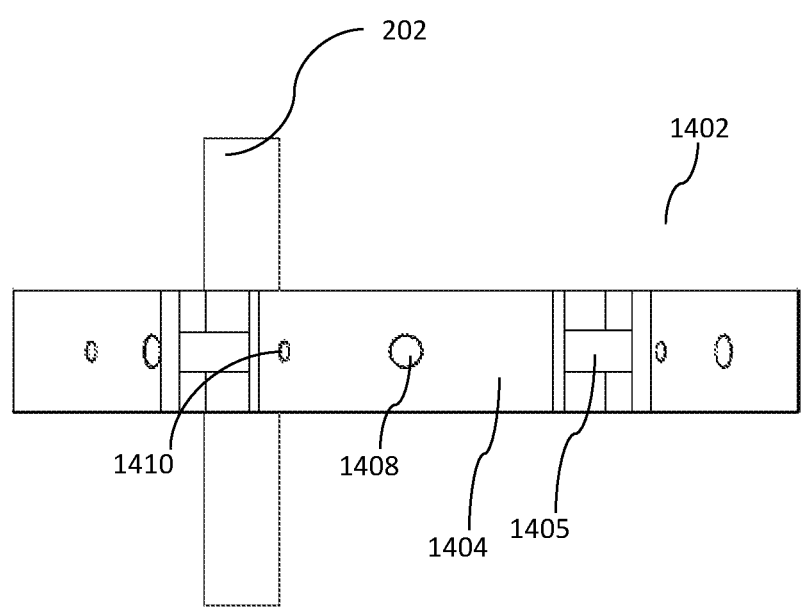
FIG. 16 is a rear view of the hexagonal support piece of FIG. 14.
Figure 17:
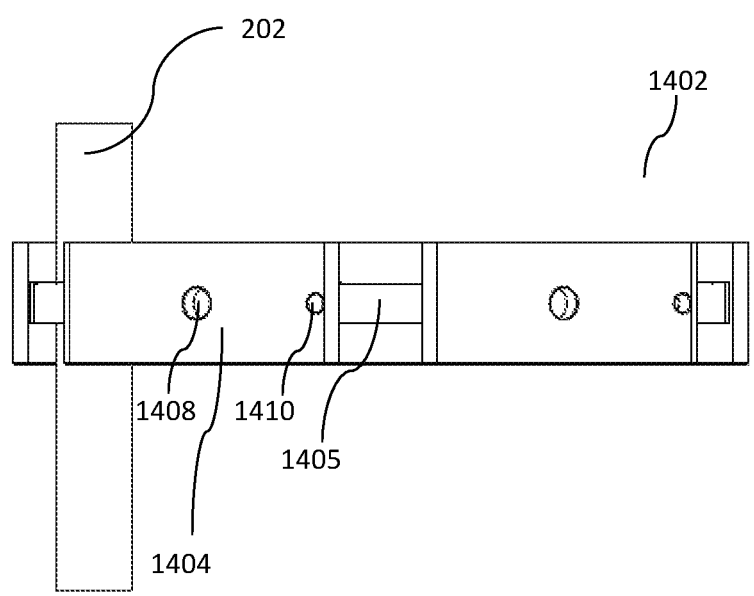
FIG. 17 is a right side view of the hexagonal support piece of FIG. 14.
Figure 18:
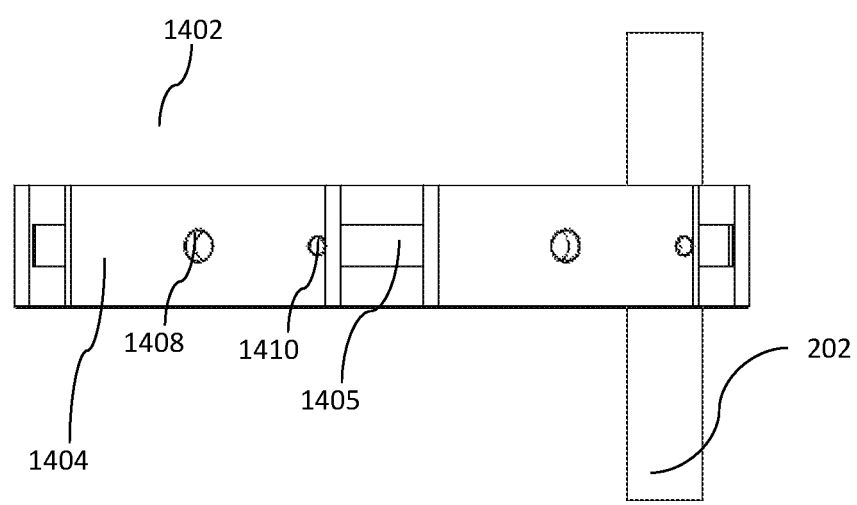
FIG. 18 is a left side view of the hexagonal support piece of FIG. 14.
Figure 19:
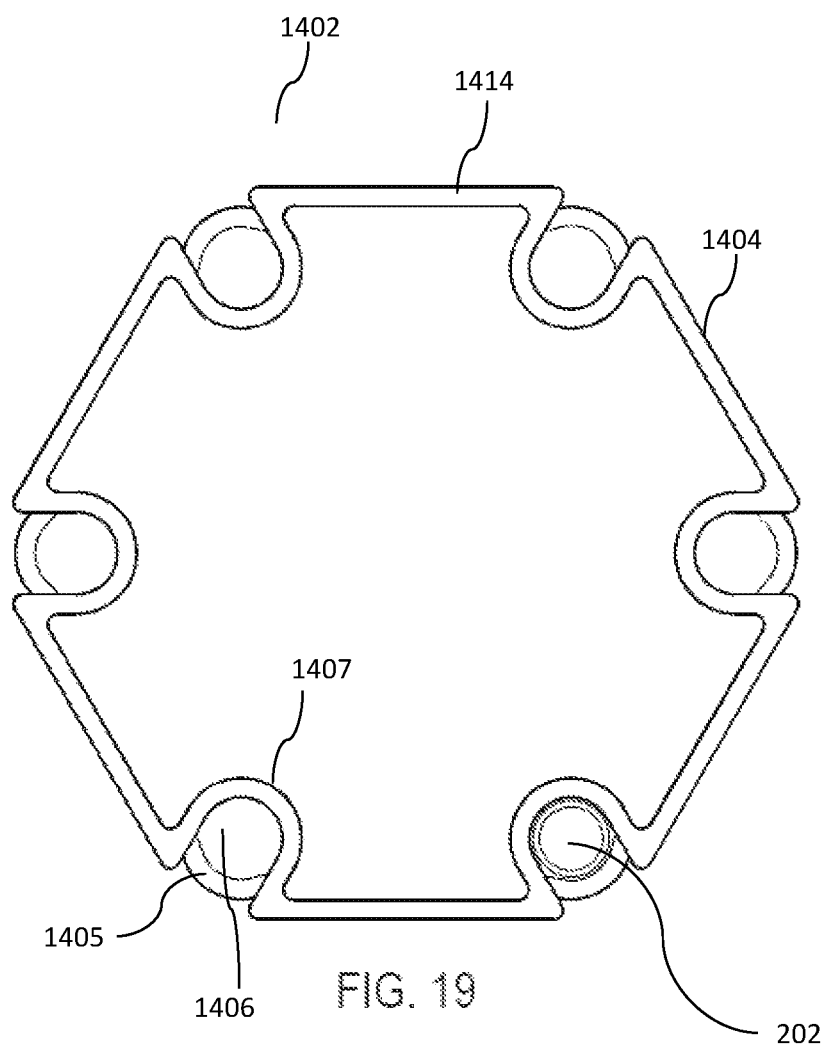
FIG. 19 is a top plan view of the hexagonal support piece of FIG. 14.
Figure 20:
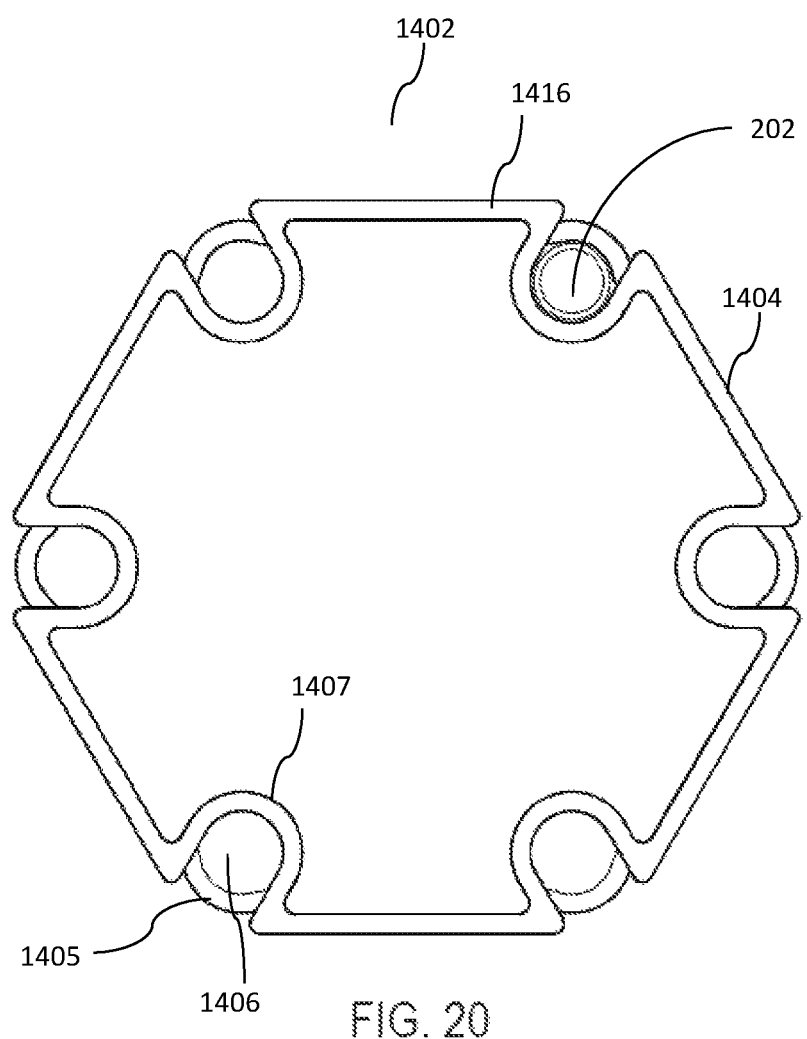
FIG. 20 is a bottom plan view of the hexagonal support piece of FIG. 14.

FIGS. 14-20 show different views of a hexagonal support piece 1402 in accordance with another exemplary embodiment of the present invention. FIG. 14 shows a perspective view, FIGS. 15-18 respectively show front, rear, right side and left side views, and FIGS. 19-20 respectively show top and bottom plan views of the hexagonal support piece 1402.

As shown in FIGS. 14-20, hexagonal support piece 1402 has six side members 1404 to form a hexagonal top and bottom surface 1414 and 1416. At least one rod clamp 1407 may be positioned between and connecting two neighboring side members 1404. In embodiments, the hexagonal support piece 1402 may have six rod clamps 1407 as shown in FIGS. 14-20. The rod clamp 1407 is configured to receive and hold a rod piece 202. In embodiments, the rod clamp 1407 may comprise a gap 1406 and a surface 1411 surrounding the gap that have a cross-section of size and shape configured to accommodate and hold a rod piece 202. For example, the surface 1411 surrounding the gap 1406 may comprise a substantially semi-cylindrical surface as shown in FIG. 14 to accommodate a cylindrical rod piece 202. In embodiments, the gap 1406 may be open toward the exterior of the hexagonal support piece 1402 (e.g., outward from the center of the hexagonal support piece 1402) in order to facilitate insertion of rod pieces 202 into the rod clamp 1407.

Figure 21A:
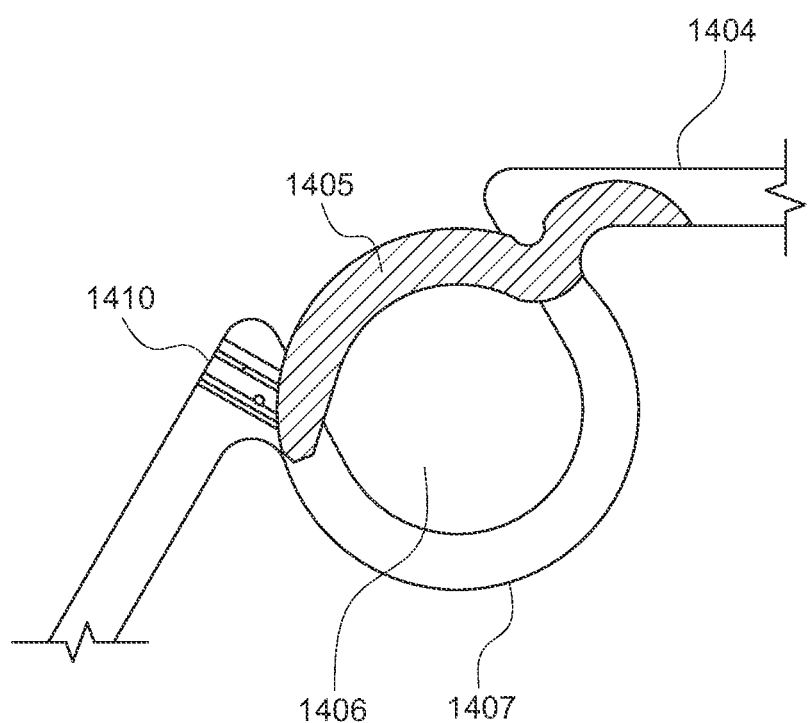
FIG. 21A is a cross sectional view of a rod clamp according to an exemplary embodiment of the invention.
Figure 21B:
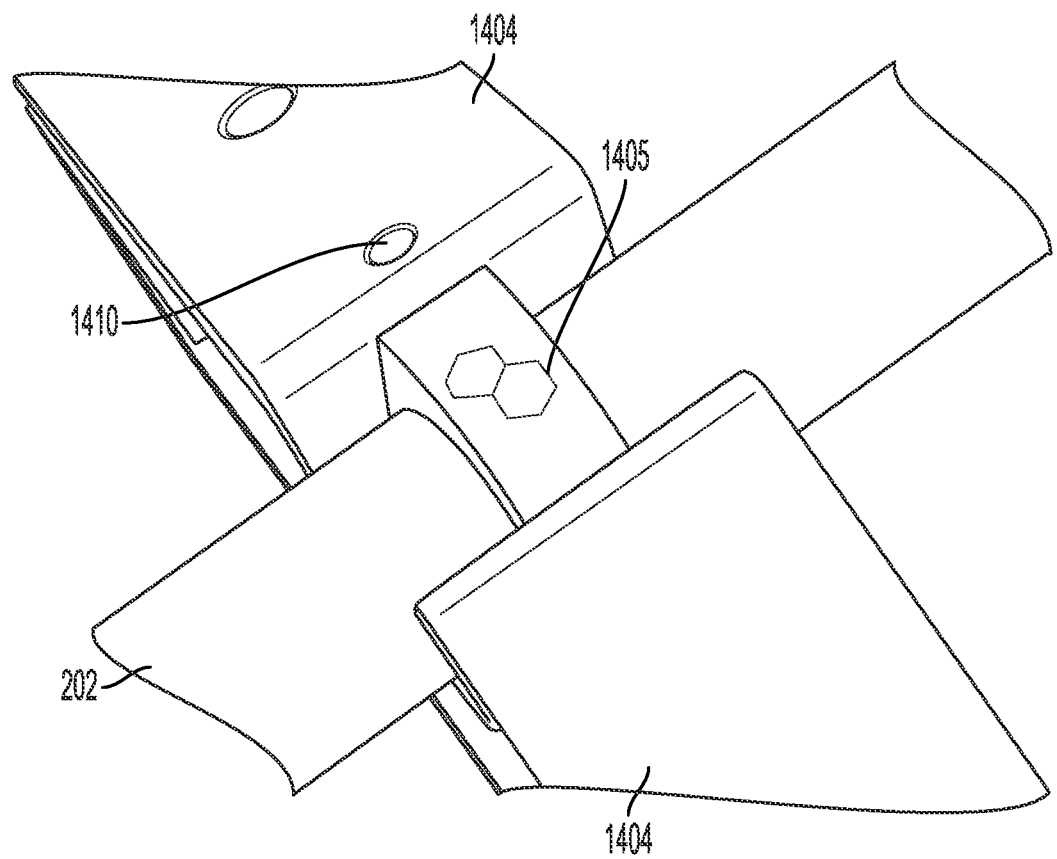
FIG. 21B shows an isometric view of a rod clamp holding a rod piece in accordance with an exemplary embodiment of the present invention.
Figure 21C:
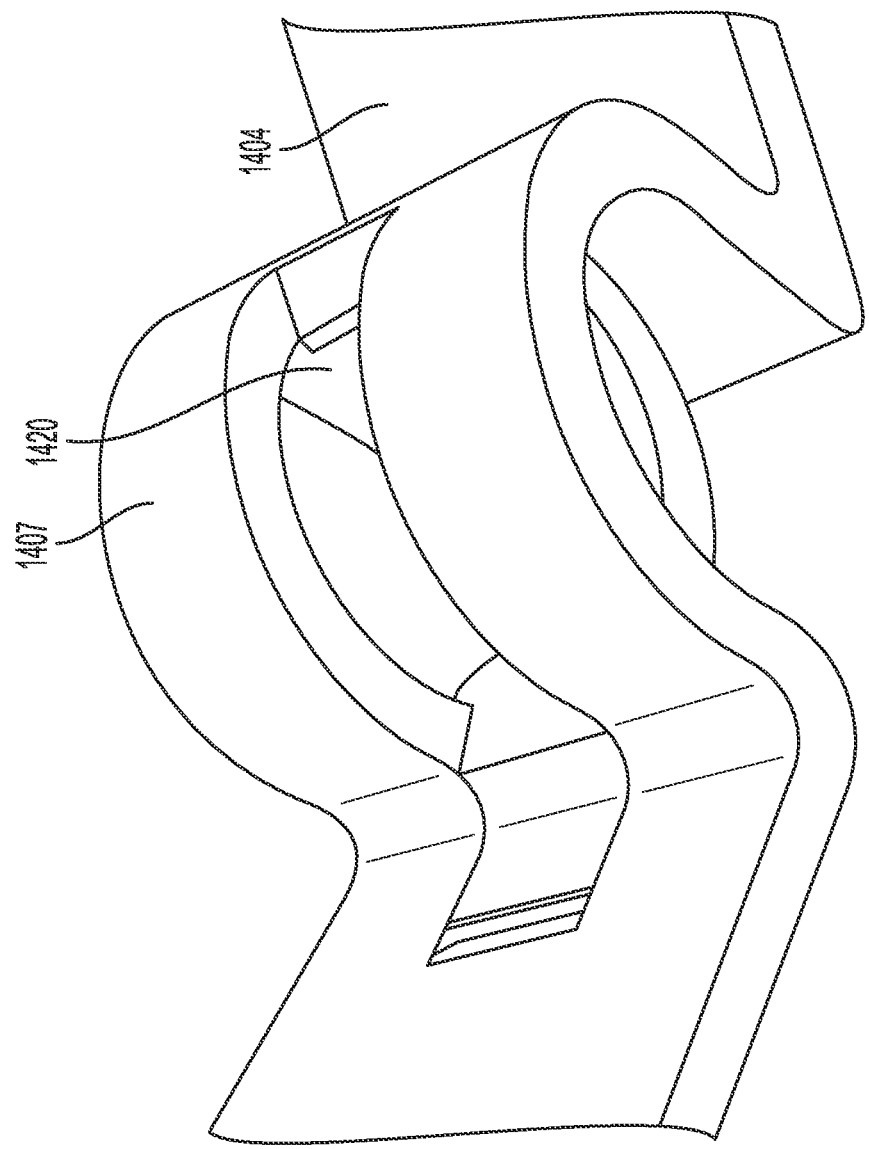
FIG. 21C shows an isometric view of a rear hole in accordance with an exemplary embodiment of the present invention.

FIGS. 21A-21C show various views of a rod clamp 1407 in accordance with an exemplary embodiment of the present invention. As shown in FIGS. 21A and 21B, in embodiments, the rod clamp 1407 may further comprise a latch 1405 configured to close the gap at least in part to hold the rod piece 202 within the gap 1406 of the rod clamp 1407. In embodiments, the rod clamp 1407 may further comprise a set screw hole 1410. FIG. 21A shows a cross-sectional view of the rod clamp 1407 comprising the gap 1406, latch 1405 and set screw hole 1410 in accordance with an exemplary embodiment of the present invention. A set screw, such as the set screw 112 in FIG. 3, may be placed into and through the set screw hole 1410 to be in contact with a portion of the latch 1405 and tighten the latch 1405 against the rod piece 202 held by the rod clamp 1407.

In embodiments, the hexagonal support piece 1402 may comprise one or more side holes 1408 in one or more side members 1404, respectively. The hexagonal support piece 1402 may be made in a plurality of sizes to accommodate construction in different settings.

In embodiments, the hexagonal support piece 1402 may be made of supportive material, including but not limited to aluminum, steel, stainless steel, rigid plastics, iron, carbon fiber, and titanium.

In embodiments, the rod clamps 1407 may be located at the joints of the side members 1404. The rod clamps 1407 may be located at a plurality of locations throughout the side member 1404. Furthermore, there may be as few as one rod clamp or a plurality of rod clamps. In embodiments, a hexagonal support piece 1402 may include a combination of one or more rod clamps 1407 such as that illustrated in FIG. 14 and one or more rod holes 106 such as those illustrated in FIG. 1A.

In embodiments, each side member 1404 may contain a side hole 1408 situated substantially centrally. In embodiments, a side hole 1408 may be located off center on each side member 1404. In embodiments, the side hole 1408 in a hexagonal support piece 1402 has a diameter of size configured to closely fit the connection bolt 402 shown in FIG. 4, for example.

The placement of connection bolts 402 may be configured to enable the hexagon support pieces 1402 to be oriented or rotated in more than one direction. This structure makes the rigging modular and adds a wide assortment of orientations and uses for the rigging system. In embodiments, the side hole 1408 and/or set screw hole 1410 may be threaded so as to connect to a screw. The threading adds additional security in fixing the pieces together. In embodiments, the side hole 1408 and/or set screw hole 1410 may be unthreaded to enable the apparatus to fit with more parts.

Figure 22A:
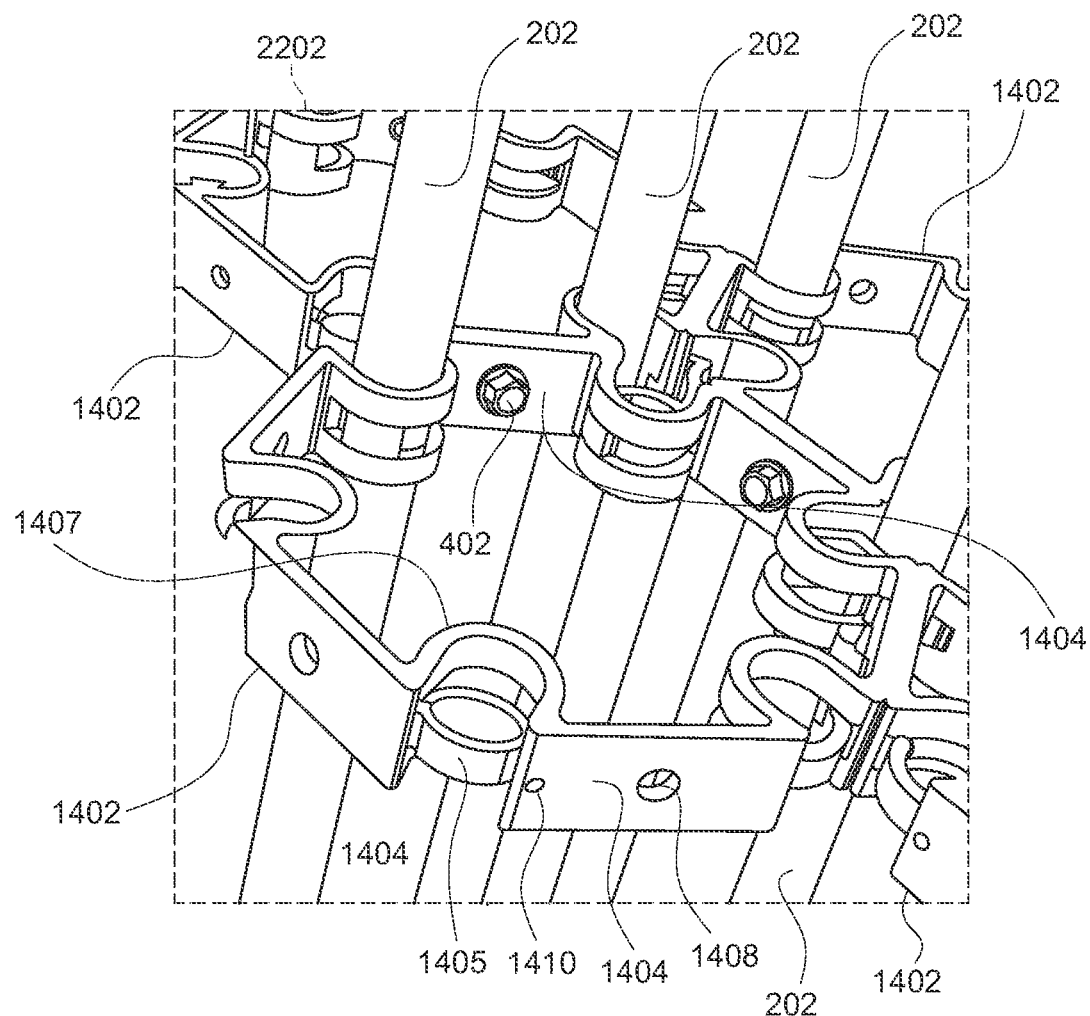
FIG. 22A shows an isometric view of a rigging apparatus 2202 in accordance with an exemplary embodiment of the present invention.

FIG. 22A shows an isometric view of an apparatus 2202 in accordance with an exemplary embodiment of the present invention. The apparatus 2202 includes at least four hexagonal support pieces 1402 connected with at least three connection bolts 402 in place in the side holes 1408 of the hexagonal support pieces 1402. The apparatus 2202 may also comprise a plurality of rod pieces 202 held by the hexagonal support pieces 1402 (e.g., four rod pieces as shown in FIG. 22A). This combination of a plurality of interconnected hexagonal support pieces 1402 may be referred to as a cluster. Clusters of hexagonal support pieces 1402 include a plurality of hexagonal support pieces 1402 connected while in contact with one another.

The hexagonal support pieces 1402 may be oriented in a plurality of directions. The hexagonal support pieces 1402 in apparatus 2202 may each be rotated a full 360 degrees, enabling the rigging to be oriented in an infinite number of directions. This contributes to the possibilities of configurations and to the modular nature of the invention. In embodiments, as can be seen in seen in FIGS. 22A and 14, for example, an outer surface of each of side member 1404 is planar. In embodiments, the outer surface of a side member 1404 on one hexagonal support member 1402 will lay flat against the outer surface of an adjacent side member of another hexagonal support member 1402 when the hexagonal support members are provided in a cluster to allow for easy and secure attachment between the two hexagonal support members. In embodiments, the inner surface of each a side member 1404 may also be planar in shape. The planar inner surface of each of the side members 1404 helps to maximize internal open space within the hexagonal support member.

Figure 22B:
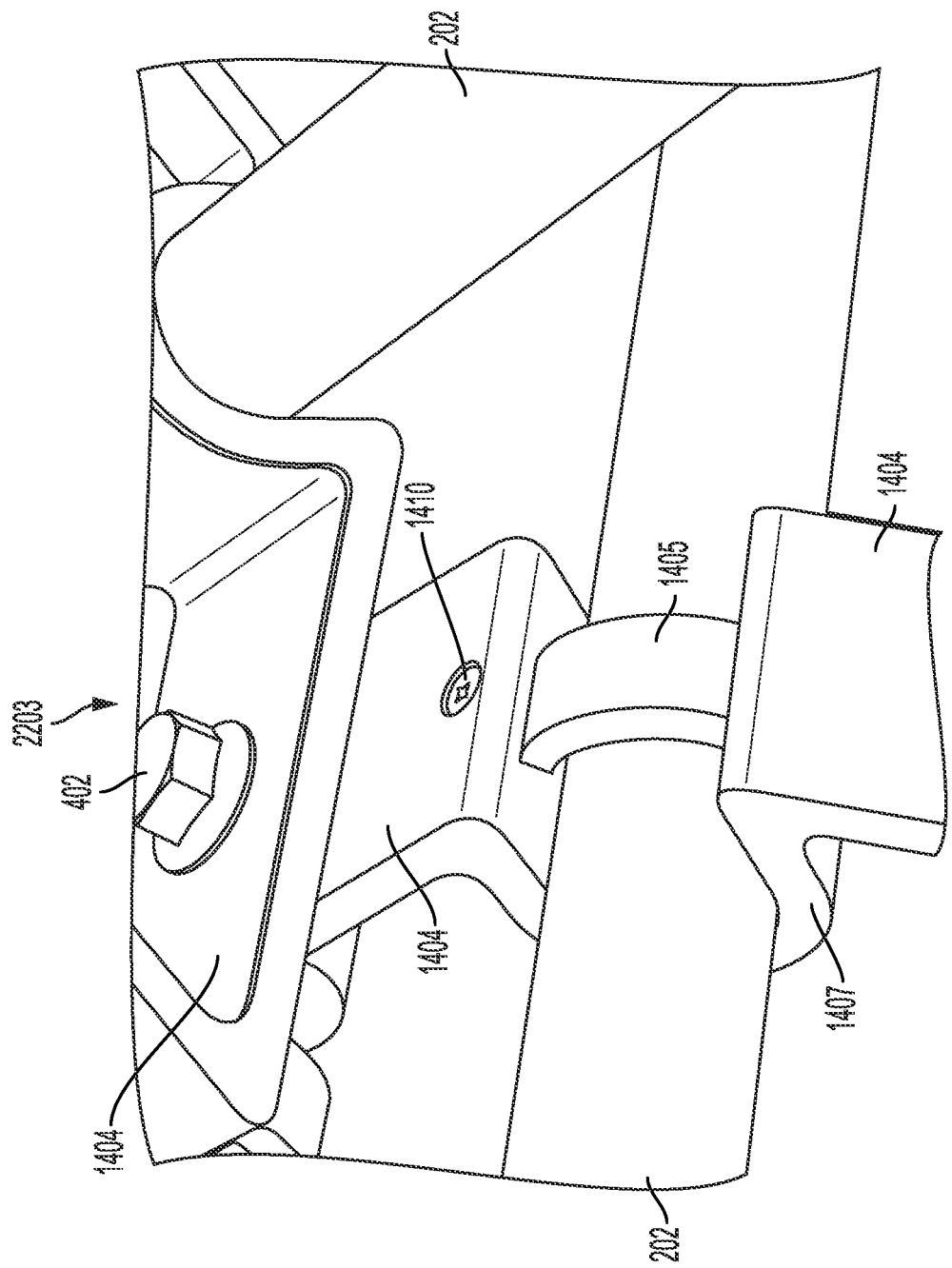
FIG. 22B shows an isometric view of a rigging apparatus 2203 in accordance with an exemplary embodiment of the present invention.

FIG. 22B shows an isometric view of an apparatus 2203, comprising a cluster of at least two hexagonal support pieces 1402 connected with a connection bolt 402 in place in a side hole 1408 of the hexagonal support pieces 1402, in accordance with an exemplary embodiment of the present invention. FIG. 22B shows that the abutting and connected side members 1404 of the two hexagonal support pieces 1402 are substantially orthogonal in direction such that they form a cross shape. The apparatus 2203 may also comprise a plurality of rod pieces 202 held by the hexagonal support pieces 1402 (e.g., two rod pieces 202 respectively held by the hexagonal support pieces 1402 in the cluster as shown in FIG. 22A).

Figure 23:
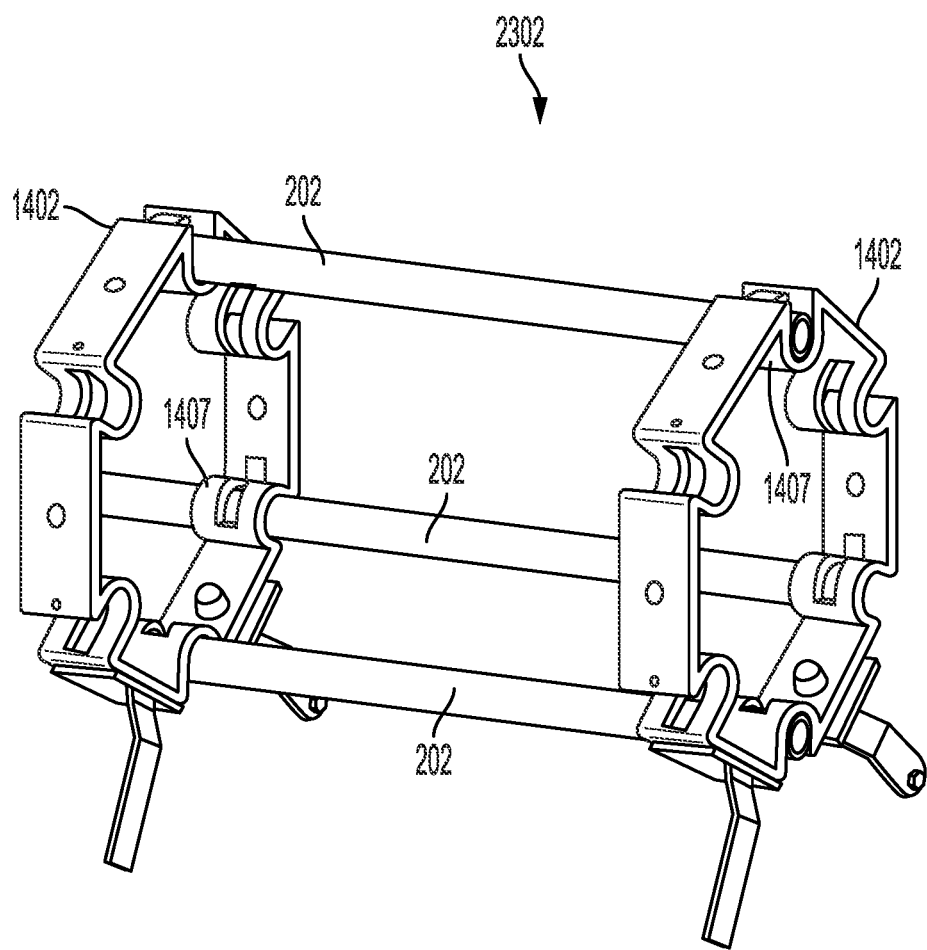
FIG. 23 shows an isometric view of a rigging apparatus 2302 in accordance with an exemplary embodiment of the present invention.
Figure 24:
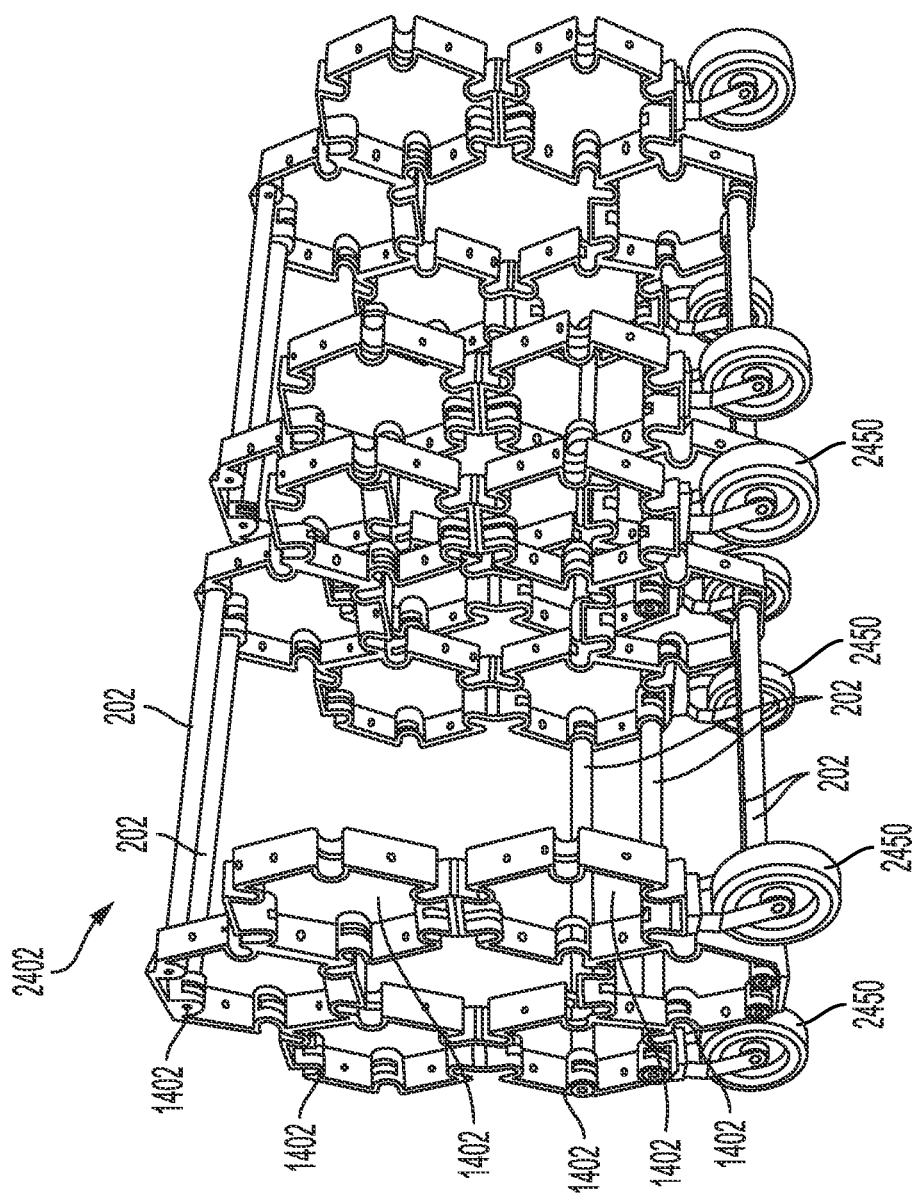
FIG. 24 shows an isometric view of a rigging apparatus 2402 in accordance with an exemplary embodiment of the present invention.

FIG. 23 shows an isometric view of apparatus 2302 including two hexagonal support pieces 1402, connected by three rod pieces 202, in accordance with an exemplary embodiment of the present invention. The apparatus 2302 shows one of a plurality of orientations and constructions that may be created using the invention. FIG. 24 shows an isometric view of apparatus 2402 including two clusters of hexagonal support pieces 1402, connected by six rod pieces 202, wherein each cluster comprises six hexagonal support pieces 1402, in accordance with an exemplary embodiment of the present invention. In embodiments, as shown in FIG. 24, at least two wheels 2450 may be attached to the ground facing side members 1404 of the hexagonal support pieces 1402 in each cluster to make the rigging apparatus 2402 mobile. Apparatus 2302 in FIG. 23 and apparatus 2402 in FIG. 24 demonstrate the versatility of the invention in that in embodiments, clusters may be formed of a different number of hexagonal support pieces 1402 and also that hexagonal support pieces 1402 may stand alone without other surrounding support pieces in a cluster. This versatility enables the invention to be used in many different settings to support many different objects or people.

Figure 25:
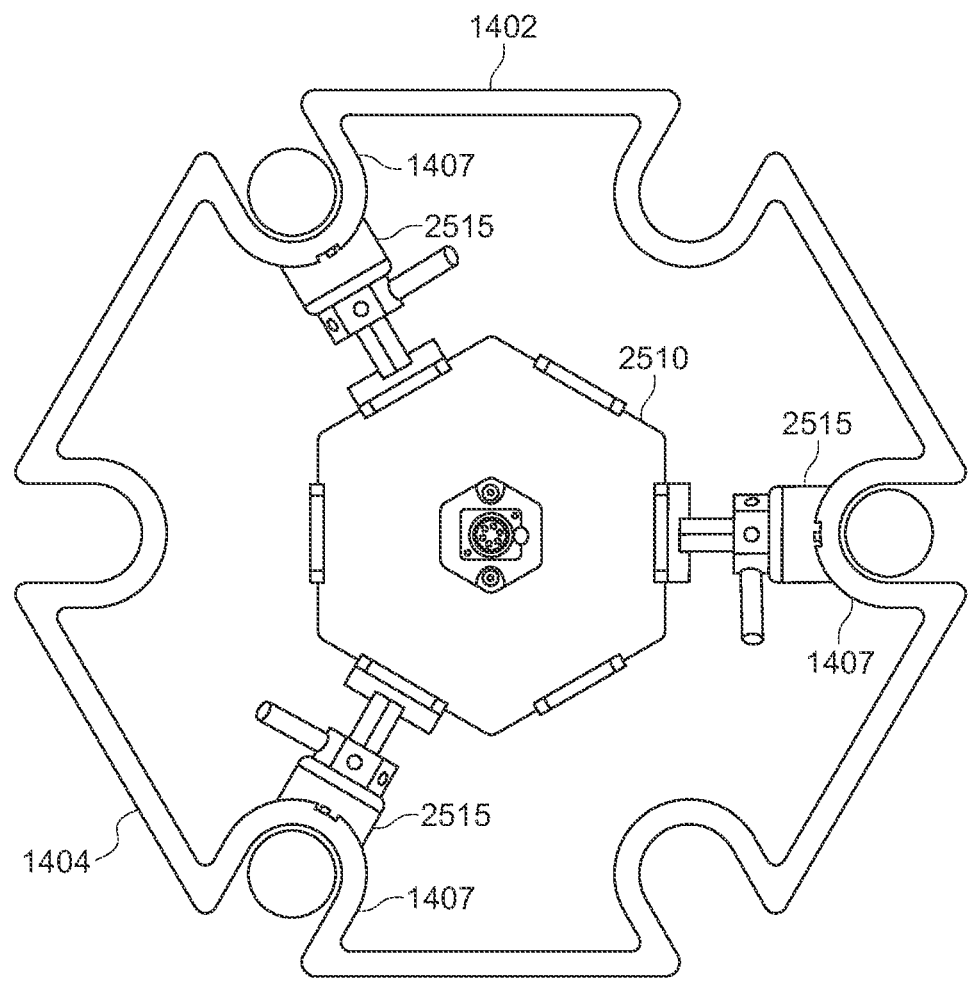
FIG. 25 shows a top plan view of a rigging apparatus 2502 in accordance with an exemplary embodiment of the present invention.
Figure 26:
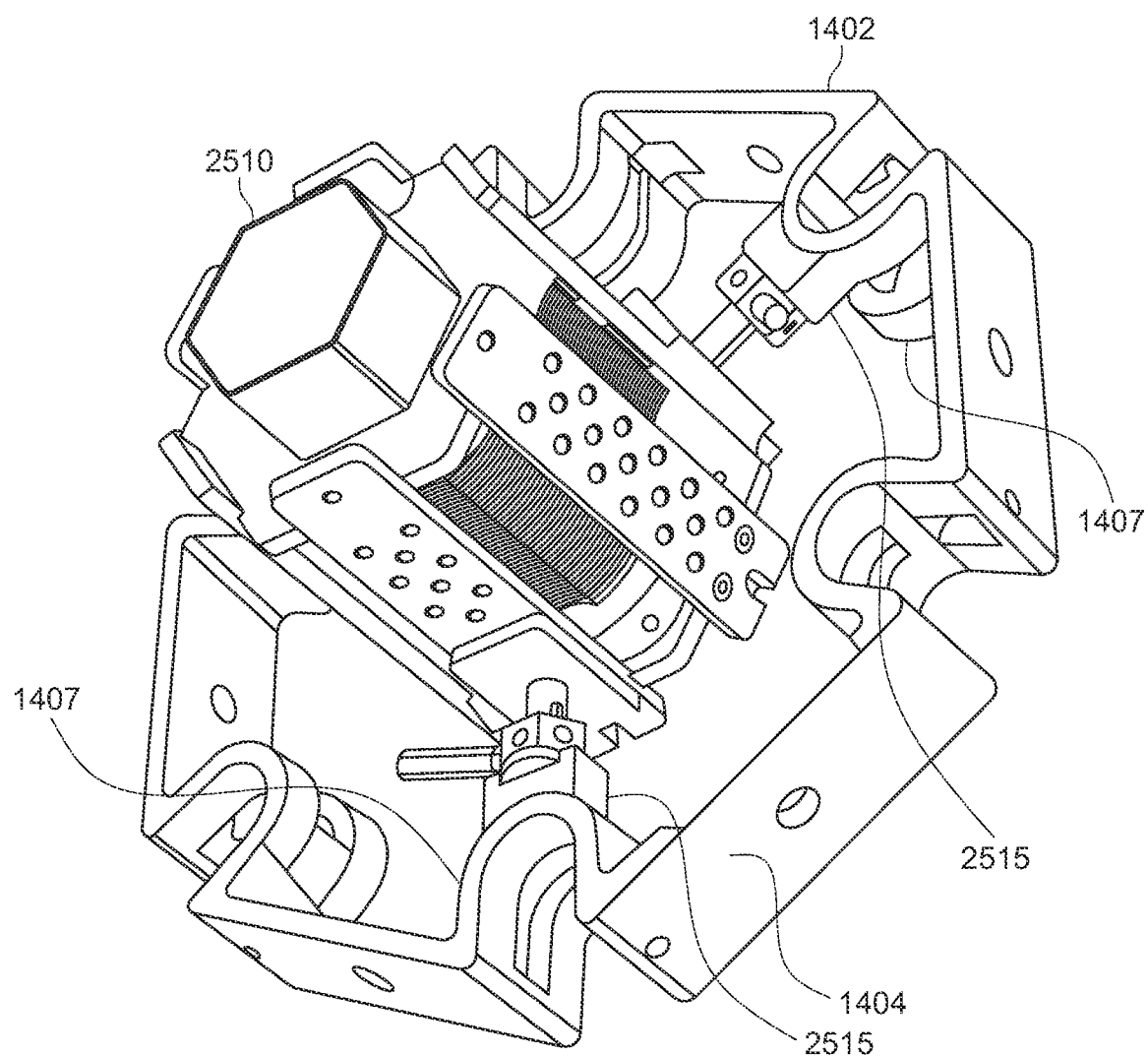
FIG. 26 shows an isometric view of a rigging apparatus 2602 in accordance with an exemplary embodiment of the present invention.

In embodiments, one or more rod clamps 1407 in a hexagonal support piece 1402 may further comprise a rear hole 1420 configured to allow insertion of a screw or a bolt in the direction toward, for example, the center of the hexagonal support piece. For example, FIGS. 14 and 21C show that the exterior surface of each rod clamp 1407 facing toward the center of the hexagonal support piece has a rear hole 1420 through which a screw or a bolt may be inserted in the direction toward the center of the hexagonal support piece. This feature may allow equipment or a device having a cross-sectional size smaller than the empty interior space within a hexagonal support piece 1402 be attached or connected to, and placed within, the hexagonal support piece, as shown, for example, in FIGS. 25 and 26. FIGS. 25 and 26, respectively, show a bottom plan view and an isometric view of a hexagonal support piece 1402 and a device 2510 held within the hexagonal support piece 1402 in accordance with exemplary embodiments of the present invention. In embodiments, as shown in FIGS. 25 and 26, the device 2510 may be held within the hexagonal support piece 1402 by a clamp formed by three support elements 2515 that are attached to the hexagonal support piece by, for example, screws or bolts inserted through rear holes 1420 in three rod clamps 1407.

Figure 27:
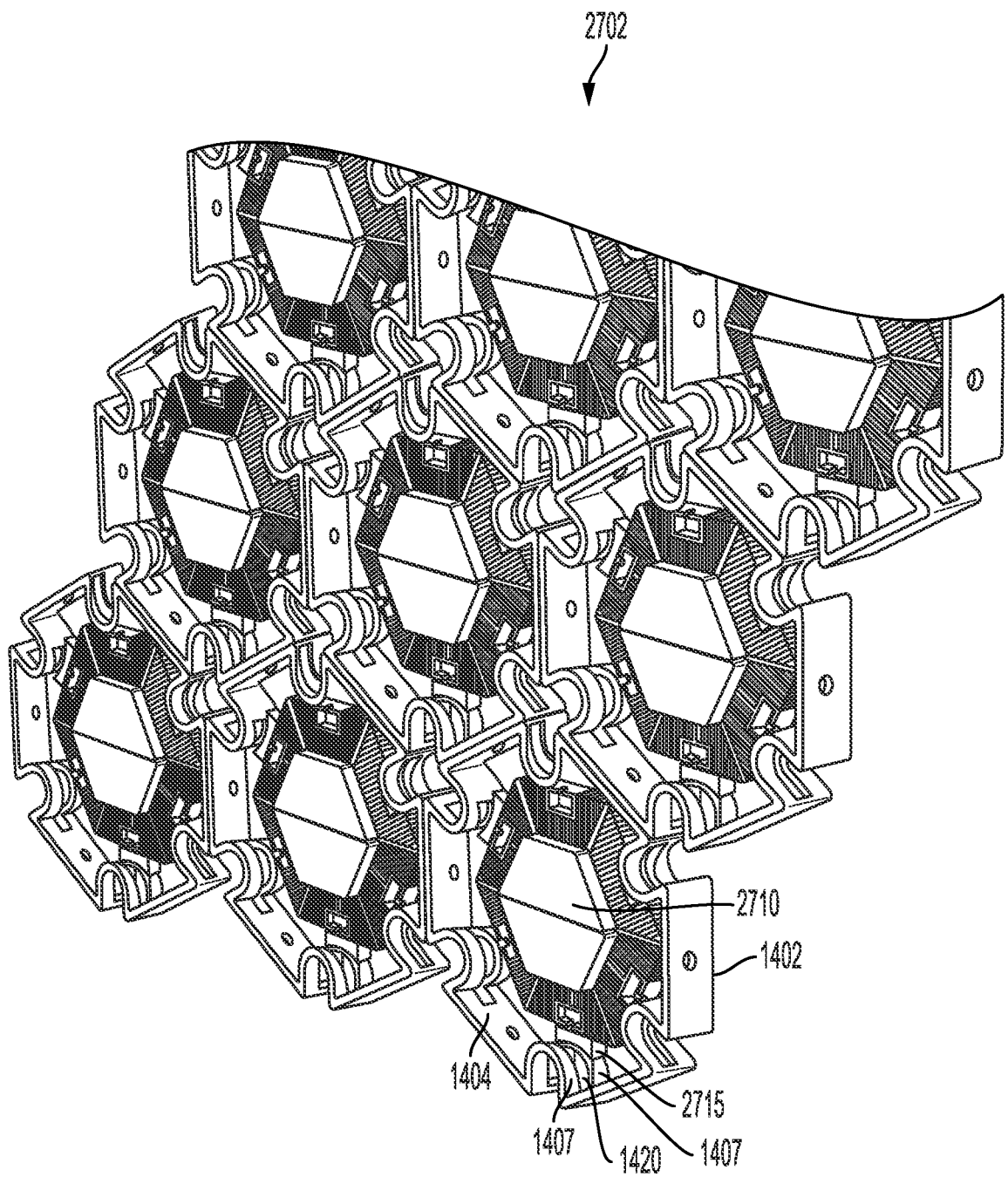
FIG. 27 shows an isometric view of a rigging apparatus 2702 in accordance with an exemplary embodiment of the present invention.

FIG. 27 shows an isometric view of a rigging apparatus 2702, comprising a cluster of at least nine hexagonal support pieces 1402, in accordance with an exemplary embodiment of the present invention. In embodiments, as shown in FIG. 27 and unlike device 2510 in FIGS. 25 and 26, a device 2710 may be held within a hexagonal support piece 1402 by a clamp formed by three support elements 2715 respectively abutting the exterior surfaces of the three rod clamps 1407 facing and curving toward the center of the hexagonal support piece. Such embodiments may have no need for support elements 2515 attached to the hexagonal support piece by screws or bolts inserted through rear holes 1420 in three rod clamps 1407 as shown in FIGS. 25 and 26. In embodiments, as shown in FIG. 27 and unlike the connected hexagonal support pieces 1402 in FIGS. 22A and 22B, the hexagonal support pieces 1402 of the cluster may not be connected with connection bolts 402 in place in side holes

1408 of the hexagonal support pieces 1402. Instead, for example, a plurality of hexagonal support pieces 1402 may form a stable cluster by physically interconnecting the devices 2710 respectively held within the hexagonal support pieces (not shown in FIG. 27).

Figure 28:
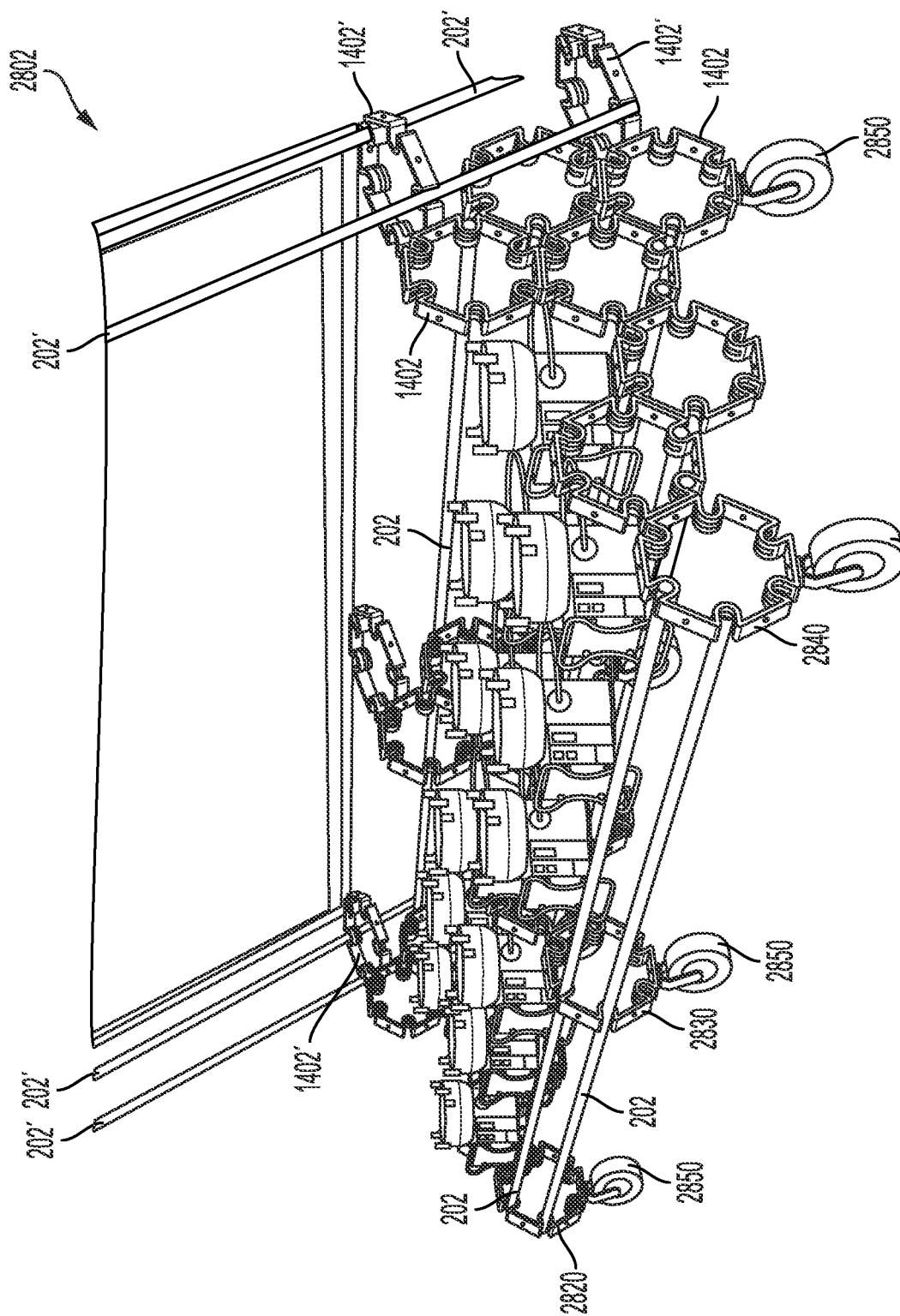
FIG. 28 shows an isometric view of a rigging apparatus 2802 in accordance with an exemplary embodiment of the present invention.

FIG. 28 shows an isometric view of a rigging apparatus 2802 for supporting lighting devices and a screen, including three clusters 2820, 2830, 2840, each comprising eight connected hexagonal support pieces 1402, 1402', in accordance with an exemplary embodiment of the present invention. In embodiments, as shown in FIG. 28, the three clusters 2820, 2830, 2840 may be connected together by, for example, seven parallel rod pieces 202 having substantially the same length. For example, as shown in FIG. 28, the first cluster 2820 may be positioned at one end of these rod pieces 202; the second cluster 2830 may be positioned substantially at the middle of these rod pieces 202; and the third cluster 2840 may be positioned at the opposite end of these rod pieces 202. In embodiments, each cluster may have at least two hexagonal support pieces 1402 oriented substantially in the same direction (FIG. 28 shows that seven hexagonal support pieces 1402 in each cluster are oriented in substantially the same direction) and at least one hexagonal support piece 1402' oriented in a direction that is perpendicular to the orientation of the at least two hexagonal support pieces oriented in the same direction. In embodiments, this hexagonal support piece 1402' in each cluster may be configured to hold one or more rod pieces 202' that are oriented in a direction perpendicular to the direction of the parallel rod pieces 202 that connect the clusters 2820, 2830, 2840. FIG. 28 shows that the hexagonal support piece 1402' in the first cluster 2820 and the hexagonal support piece 1402' in the third cluster 2840 together hold at least two parallel rod pieces 202' that are oriented in a direction perpendicular to the seven parallel rod pieces 202 that connect the three clusters 2820, 2830, 2840. In embodiments, the rod piece 202' may be held by the hexagonal support piece 1402' at an angle between 0° and 90° with respect to the ground. For example, the rod piece 202' may be held by the hexagonal support piece 1402' at 30° or 60° with respect to the ground, depending on how the hexagonal support piece 1402 and the hexagonal support piece 1402' are connected. FIG. 28 shows that one of the side members 1404 of the hexagonal support piece 1402' abuts and is attached, orthogonal in direction, to a side member 1404 of the hexagonal support piece 1402 that is at 60° with respect to the ground. As such, the rod piece 202' held by the hexagonal support piece 1402' is likewise at 60° with respect to the ground. In embodiments, as shown in FIG. 28 and like the mobile rigging apparatus 2402 in FIG. 24, at least two wheels 2850 may be attached to the ground facing side members 1404 of the hexagonal support pieces 1402 in each of the clusters 2820, 2830, 2840 to make the rigging apparatus 2802 mobile. The rigging apparatus 2802 in FIG. 28 demonstrates versatile uses of clusters formed of a different number of hexagonal support pieces 1402 in various configurations and orientations. This versatility enables the invention to be used in many different settings to support many different objects or people.

Figure 29:
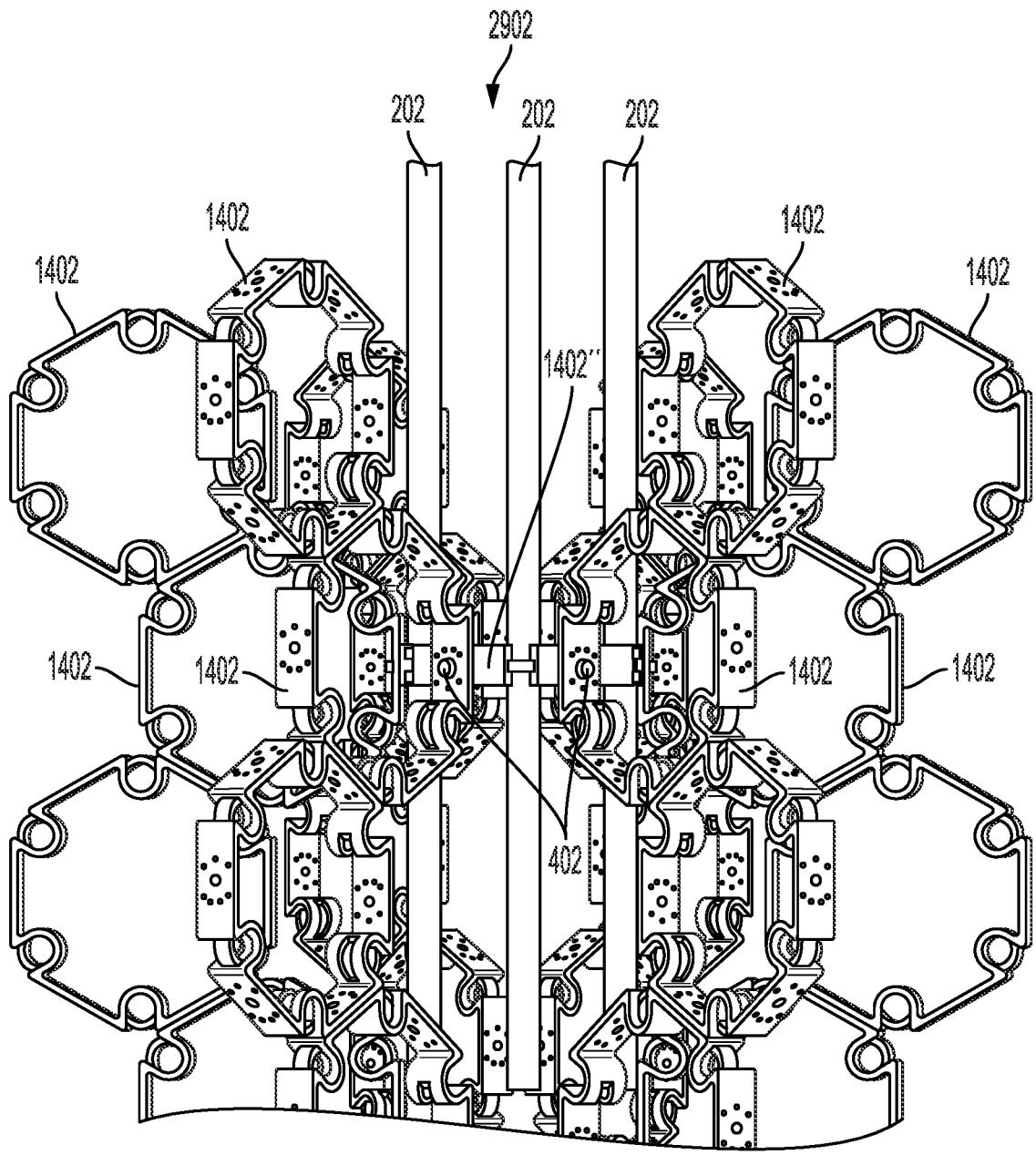
FIG. 29 shows an isometric view of a rigging apparatus 2902 in accordance with an exemplary embodiment of the present invention.
Figure 30:
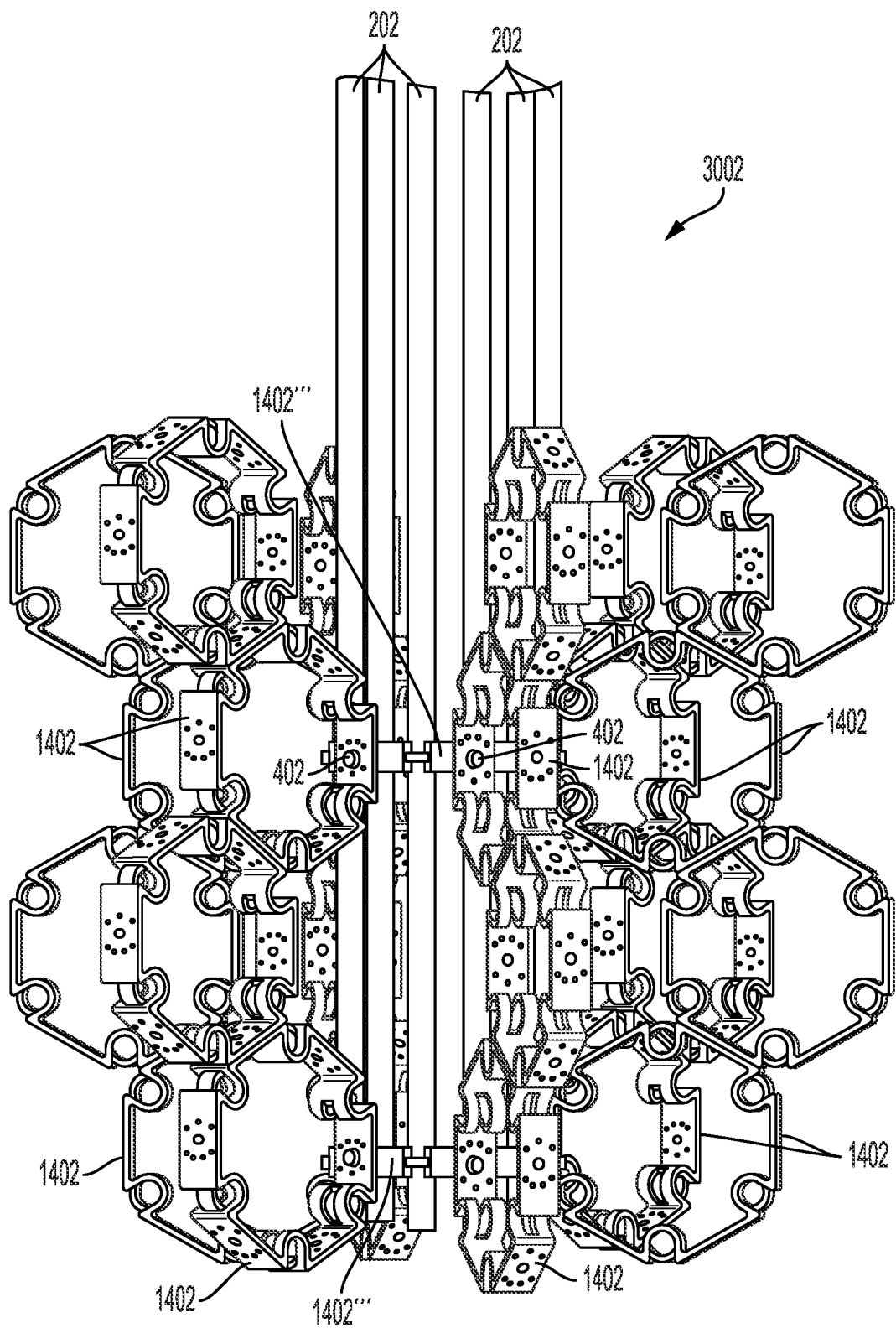
FIG. 30 shows an isometric view of a rigging apparatus 3002 in accordance with an exemplary embodiment of the present invention.

FIGS. 29 and 30 show isometric views of similar rigging apparatus 2902, 3002 in accordance with exemplary embodiments of the present invention. FIG. 29 shows the rigging apparatus 2902 comprising at least one hexagonal support piece 1402", placed horizontally with respect to the ground and holding three rod pieces 202 that are all perpendicular to the ground, while FIG. 30 shows the rigging apparatus 3002 comprising two hexagonal support pieces 1402''', both placed horizontally with respect to the ground and holding six rod pieces 202 that are all perpendicular to the ground. In FIG. 29, at least five clusters of connected hexagonal support pieces 1402 are attached to the corresponding number of side members 1404 of the hexagonal support piece 1402". Each cluster may comprise at least four connected hexagonal support pieces 1402 and a side member 1404 of one of the hexagonal support pieces 1402 in the cluster abuts and is attached to, orthogonal in direction, to a side member 1404 of the hexagonal support piece 1402". In FIG. 30, at least six clusters of connected hexagonal support pieces 1402 are attached to the corresponding number of side members 1404 of the hexagonal support piece 1402'''. Each cluster may comprise at least four connected hexagonal support pieces 1402. In embodiments, as shown in FIG. 30, side members 1404 of two of the hexagonal support pieces 1402 in each cluster abut and are attached to, orthogonal in direction, to corresponding side members 1404 of the two hexagonal support pieces 1402''', respectively. The rigging apparatus 2902 and 3002 in FIGS. 29 and 30 demonstrate versatile uses of clusters formed of a different number of hexagonal support pieces 1402 in various configurations and orientations that are connected by one or more hexagonal support pieces. This versatility enables the invention to be used in many different settings to support many different objects or people.

Figure 31:
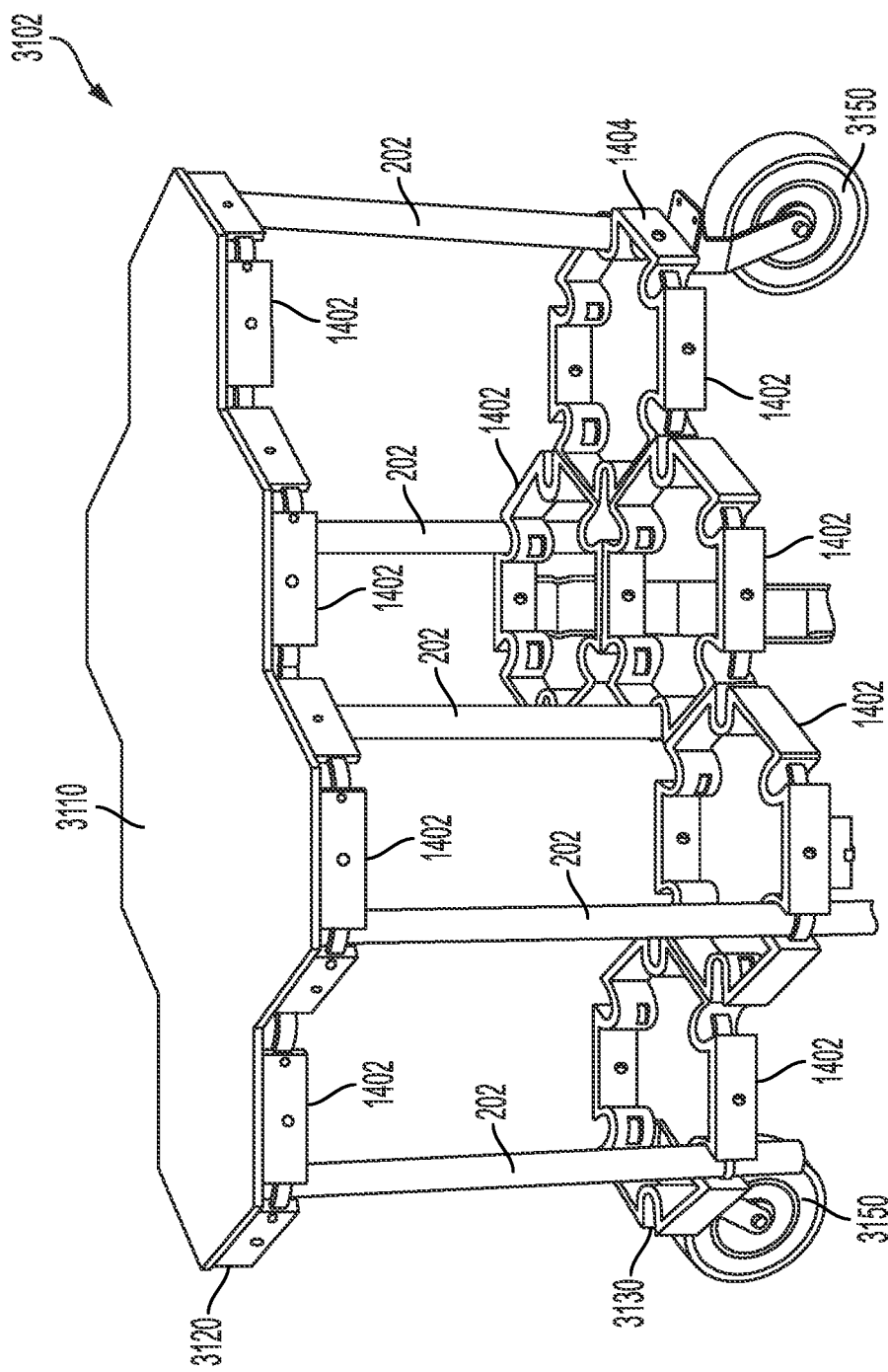
FIG. 31 shows an isometric view of a rigging apparatus 3102 in accordance with an exemplary embodiment of the present invention.

FIG. 31 shows an isometric view of an apparatus 3102 including two horizontally parallel clusters 3120, 3130 of hexagonal support pieces 1402, which both hold, and are connected by, five parallel vertically placed rod pieces 202, in accordance with an exemplary embodiment of the present invention. In FIG. 31, each cluster comprises five connected hexagonal support pieces 1402. In embodiments, as shown in FIG. 31, the bottom cluster 3130 of hexagonal support pieces may support at least three wheels 3150 to make the rigging apparatus 3102 mobile. In embodiments, as shown in FIG. 31, the wheels 3150 may be respectively attached to side panels 1404 of different hexagonal support pieces 1402 in the bottom cluster 3130. In alternative embodiments, wheels may be respectively attached to the bottom ends of the rod pieces 202 held within rod clamps 1407 of the hexagonal support pieces 1402 in the bottom cluster 3130. In embodiments, as shown in FIG. 31, the top cluster 3120 of hexagonal support pieces may be covered with a planar surface 3110 so that, for example, the apparatus 3102 may be used as a mobile table or desk.

Figure 32:
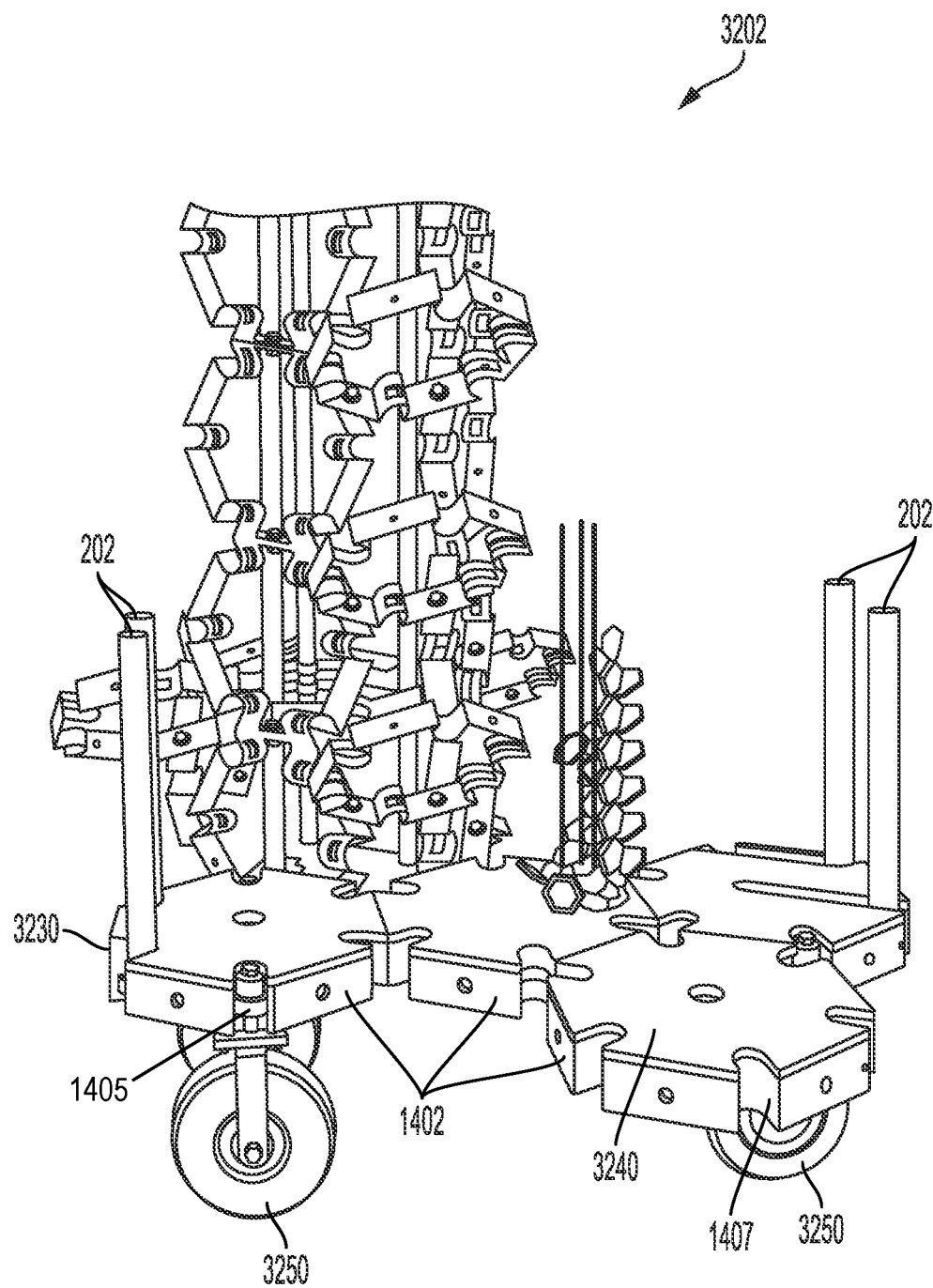
FIG. 32 shows an isometric view of a rigging apparatus 3202 in accordance with an exemplary embodiment of the present invention.
Figure 33:
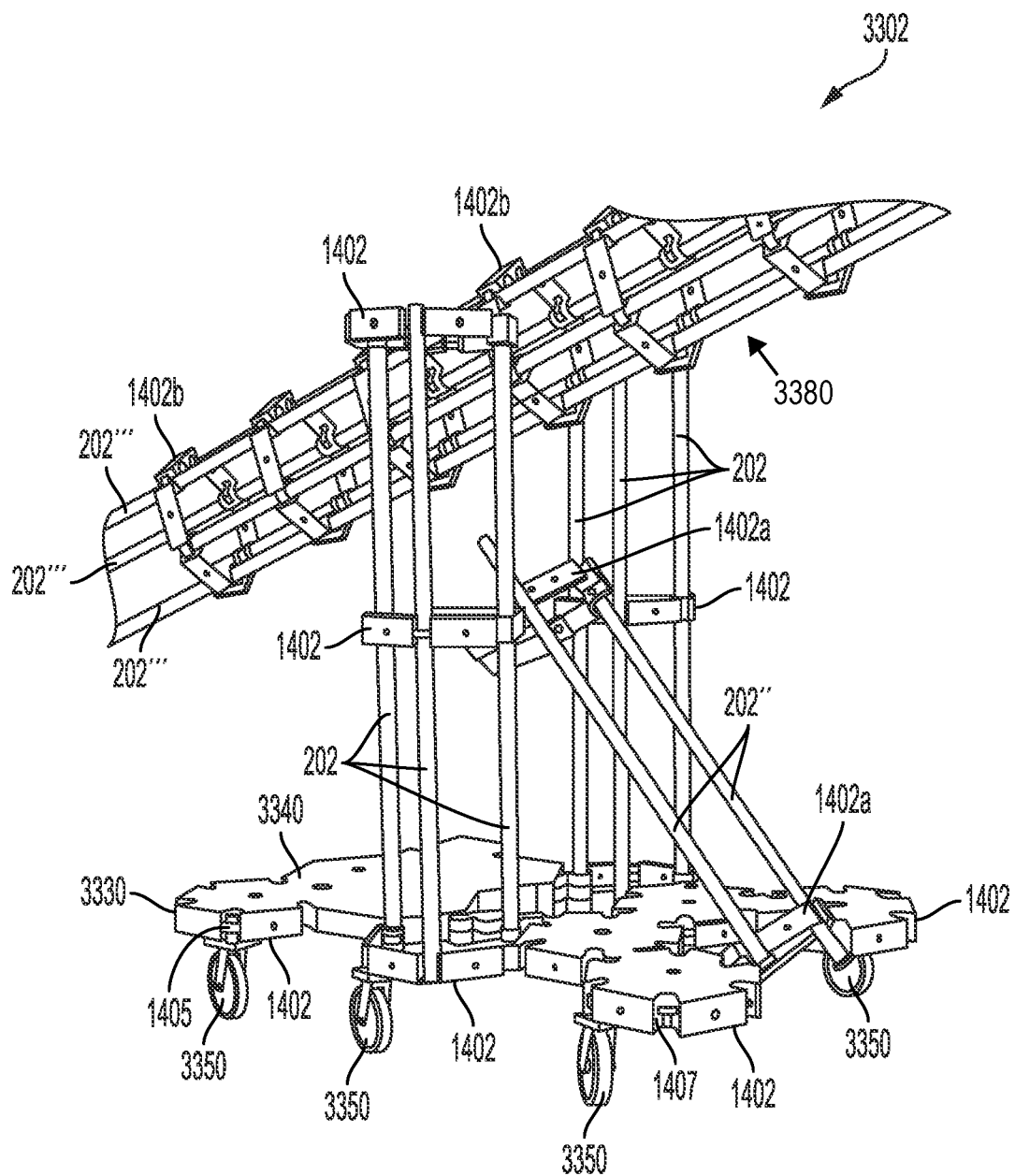
FIG. 33 shows an isometric view of a rigging apparatus 3302 in accordance with an exemplary embodiment of the present invention.

FIGS. 32 and 33 show isometric views of rigging apparatus 3202 and 3302 having wheels 3250, 3350 in accordance with exemplary embodiments of the present invention. In embodiments, as shown in FIGS. 32 and 33, at least one ground facing cluster 3230, 3330 of hexagonal support pieces in the rigging apparatus 3202, 3302 may support at least three wheels 3250, 3350 to make the rigging apparatus 3202, 3302 mobile. In embodiments, as shown in FIGS. 32 and 33, each of the wheels 3250, 3350 may be held by a latch 1405 in one of the rod clamps 1407 of the hexagonal support piece 1402 in the ground facing cluster 3230, 3330. In embodiments, the top of each of some or all of the hexagonal support pieces 1402 in the ground facing cluster 3230, 3330 may be covered with a planar surface 3240, 3340, except for the areas of its rod clamps 1407 to allow holding of rod pieces 202 within the rod clamps 1407, as shown in FIGS. 32 and 33. FIG. 32 shows four rod pieces 202 held vertically upward by two of the hexagonal support pieces 1402 in the ground facing cluster 3230.

As shown in FIG. 33, the ground facing cluster 3330 made of multiple hexagonal support pieces 1402 can be configured to support a complex structure. In embodiments, as shown in FIG. 33, each of two hexagonal support pieces 1402 in the ground facing cluster 3330 holds the bottom portions of three rod pieces 202. In embodiments, as shown in FIG. 33, both sets of three rod pieces 202 may be held vertically upward. In embodiments, as shown in FIG. 33, the top and middle portions of the three rod pieces 202 are respectively held by two hexagonal support pieces 1402, which are both oriented in parallel with the hexagonal support piece in the ground facing cluster 3330 holding the bottom portions of these three rod pieces. In embodiments, as shown in FIG. 33, all three hexagonal support pieces respectively holding the bottom, middle and top portions of the three rod pieces 202 may be oriented horizontally with respect to the ground. In embodiments, as shown in FIG. 33, at least one 1402a of the hexagonal support pieces in the ground facing cluster 3330 may be oriented at an angle (e.g., 10°, 30°, 45°, to name a few) that is not in parallel with respect to the ground. In embodiments, as shown in FIG. 33, this inclined hexagonal support piece 1402a holds the bottom portions of two rod pieces 202" within its rod clamps 1407. In embodiments, as shown in FIG. 33, these two rod pieces 202" are held at an angle that is not perpendicular to the ground (e.g., 90° minus the angle of the inclined hexagonal support piece 1402a with respect to the ground). In embodiments, as shown in FIG. 33, the upper portions of the two rod pieces 202" may also be held by a hexagonal support piece 1402a, which is oriented in parallel with the inclined hexagonal support piece 1402a holding the bottom portions of the two rod pieces 202". In embodiments, as shown in FIG. 33, a side member 1404 of the hexagonal support piece 1402a holding the upper portions of the two rod pieces 202" may abut and be attached to a side member 1404 of one of the hexagonal support pieces 1402 that holds the middle portions of the three vertically upright rod pieces 202. In embodiments, as shown in FIG. 33, the opposing side member 1404 of the hexagonal support piece 1402a may likewise abut and be attached to a side member 1404 of the other one of the hexagonal support pieces 1402 that holds the middle portions of another set of three vertically upright rod pieces 202.

In embodiments, as shown in FIG. 33, the rigging apparatus 3302 may be configured to support a structure 3380 made of a plurality of hexagonal support pieces 1402b connected by one or more rod pieces 202'''. FIG. 33 shows an array of at least six hexagonal support pieces 1402b oriented in parallel and spaced apart by substantially the same distance. In embodiments, as shown in FIG. 33, these hexagonal support pieces are connected together by six parallel rod pieces 202''' of, for example, substantially the same length. In embodiments, as shown in FIG. 33, all six rod clamps 1407 of each of the hexagonal support pieces 1402b respectively hold certain portions of the six parallel rod pieces 202. In embodiments, as shown in FIG. 33, the structure 3380 may be connected to the hexagonal support pieces 1402 that respectively hold the top portions of the two sets of three vertically upright rod pieces 202. For example, as shown in FIG. 33, two opposing side members 1404 of one of the hexagonal support pieces 1402b in the structure 3380 may respectively abut and be attached to side members 1404 of the two hexagonal support pieces 1402 that respectively hold the top portions of the two sets of three vertically upright rod pieces 202. The rigging apparatus 3302 demonstrates the versatility of the invention in that in embodiments, various structures and clusters may be formed of a different number of hexagonal support pieces 1402 and rod pieces 202 in different configurations and orientations. This versatility enables the invention to be used in many different settings to support many different objects or people.

Figure 34:
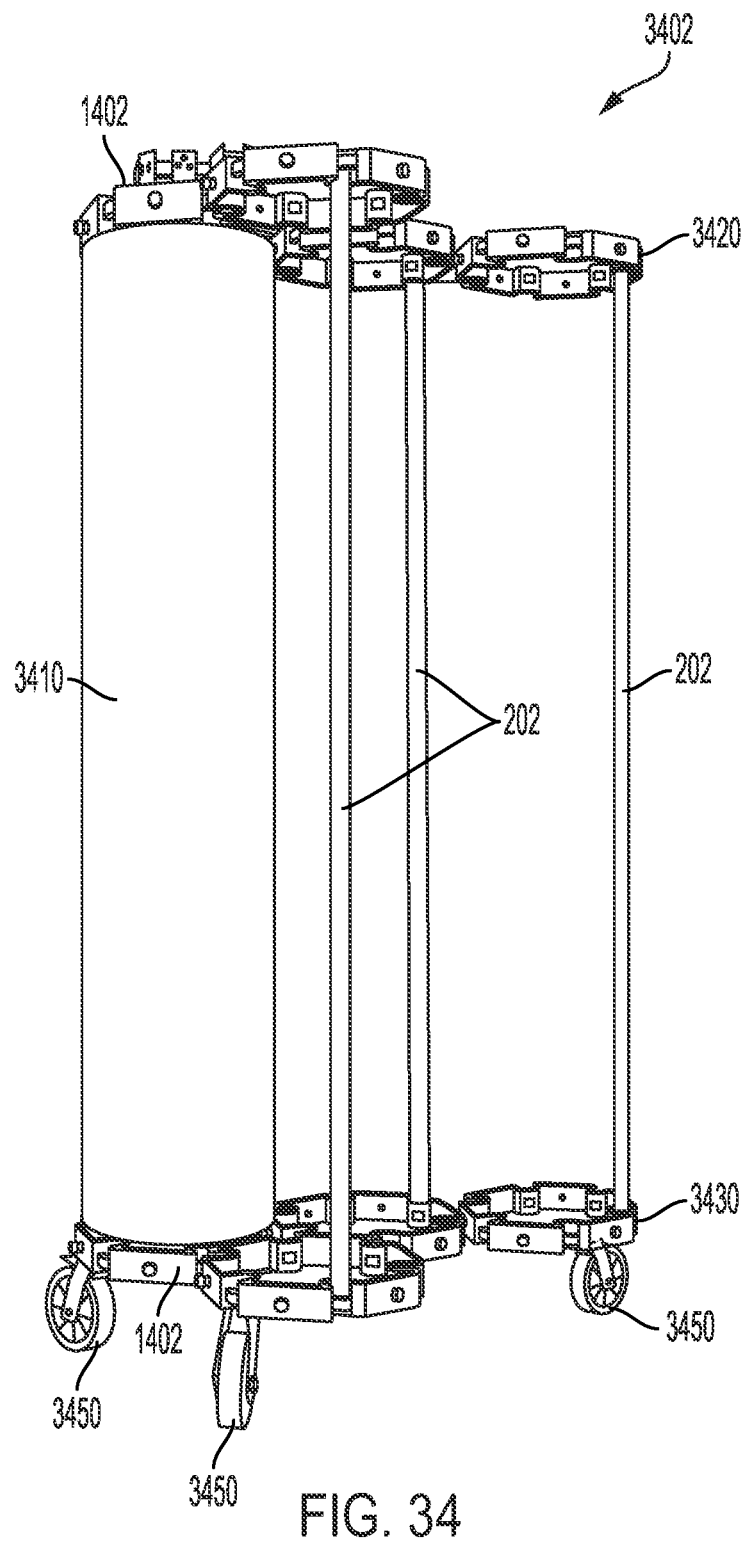
FIG. 34 shows an isometric view of a rigging apparatus 3402 in accordance with an exemplary embodiment of the present invention.

FIG. 34 shows an isometric view of a rigging apparatus 3402 including two horizontally parallel clusters 3420, 3430 of hexagonal support pieces 1402, which both hold, and are connected by, at least three parallel vertically placed rod pieces 202, in accordance with an exemplary embodiment of the present invention. In FIG. 34, each cluster comprises four connected hexagonal support pieces 1402. In embodiments, a pair of vertically opposite hexagonal support pieces 1402, one from the top cluster 3420 and the other from the bottom cluster 3430, may support a device, for example, a lighting device 3410, as shown in FIG. 34. In embodiments, as shown in FIG. 34, at least three wheels 3450 may be attached to the hexagonal support pieces 1402 in the bottom cluster 3430 to make the rigging apparatus 3402 mobile.

Figure 35:
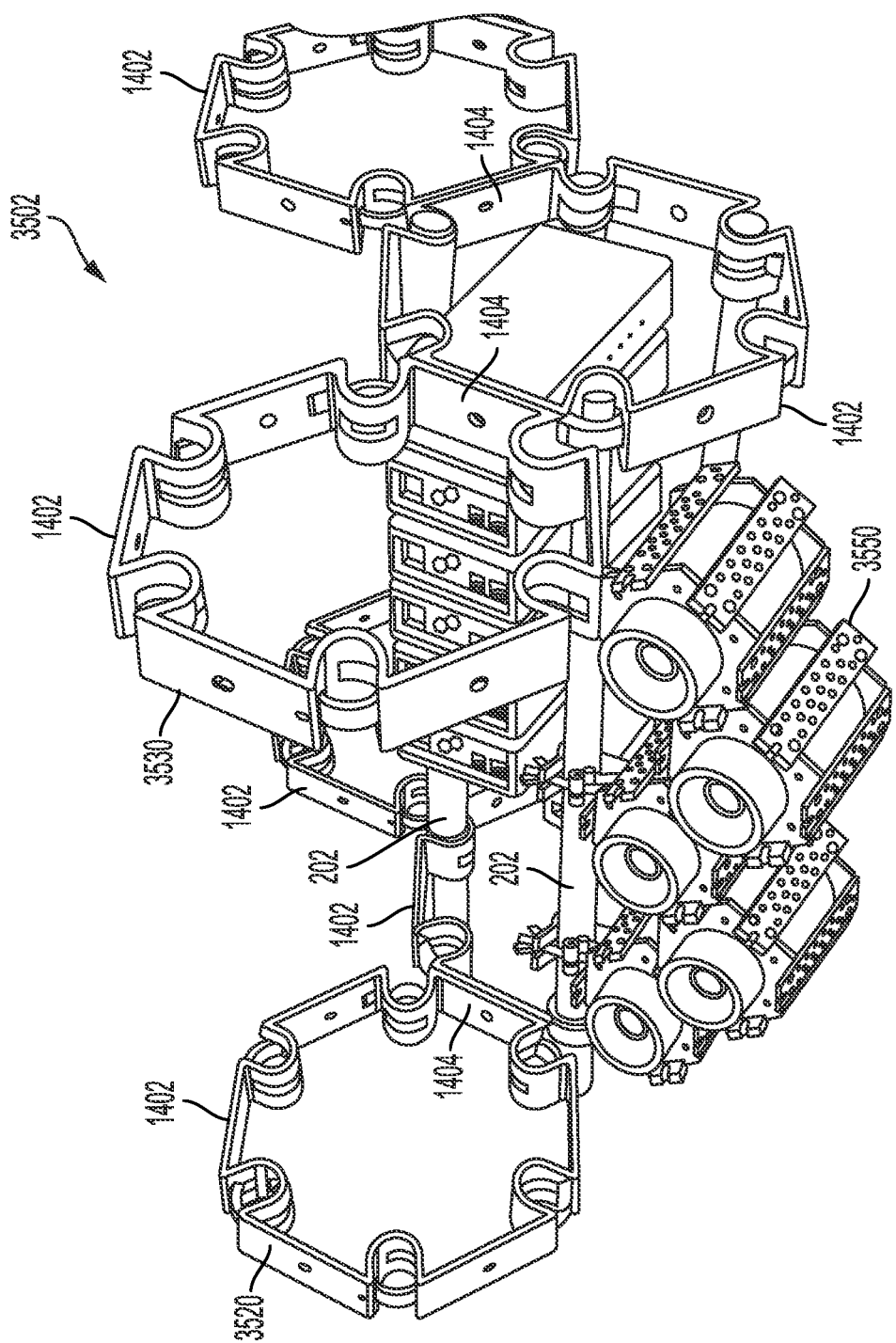
FIG. 35 shows an isometric view of a rigging apparatus 3502 in accordance with an exemplary embodiment of the present invention.

FIG. 35 shows an isometric view of a rigging apparatus 3502 for supporting a device (e.g., lighting devices 3550), including two clusters 3520, 3530, each comprising three connected hexagonal support pieces 1402, in accordance with an exemplary embodiment of the present invention. In embodiments, as shown in FIG. 35, the two clusters 3520, 3530 may be connected together by at least two parallel rod pieces 202. For example, as shown in FIG. 35, the first cluster 3520 may be positioned at the left end of these rod pieces 202 and the second cluster 3530 may be positioned at the right end of these rod pieces 202. In embodiments, as shown in FIG. 35, all three hexagonal support pieces 1402 in each cluster may be oriented substantially in the same direction (i.e., the connecting side members 1404 of the neighboring hexagonal support pieces 1402 abut and are attached to each other in parallel). In embodiments, at least one hexagonal support piece 1402 in the cluster may be oriented in a direction that is different from the orientation of the other hexagonal support pieces in the cluster. For example, the connecting side members 1404 of at least two neighboring hexagonal support pieces 1402 may abut and be attached to each other at an angle (e.g., 30°, 45°, 90°, to name a few), not in parallel. In embodiments, as shown in FIG. 35, at least one of the rod pieces 202 in the rigging apparatus 3502 may be used to hold and support devices, such as lighting devices 3550, between the two parallel clusters 3520, 3530 of hexagonal support pieces 1402. The rigging apparatus 3502 in FIG. 35 demonstrates versatile uses of clusters formed of a different number of hexagonal support pieces 1402 in various configurations and orientations. This versatility enables the invention to be used in many different settings to support many different objects or people.

Figure 36:
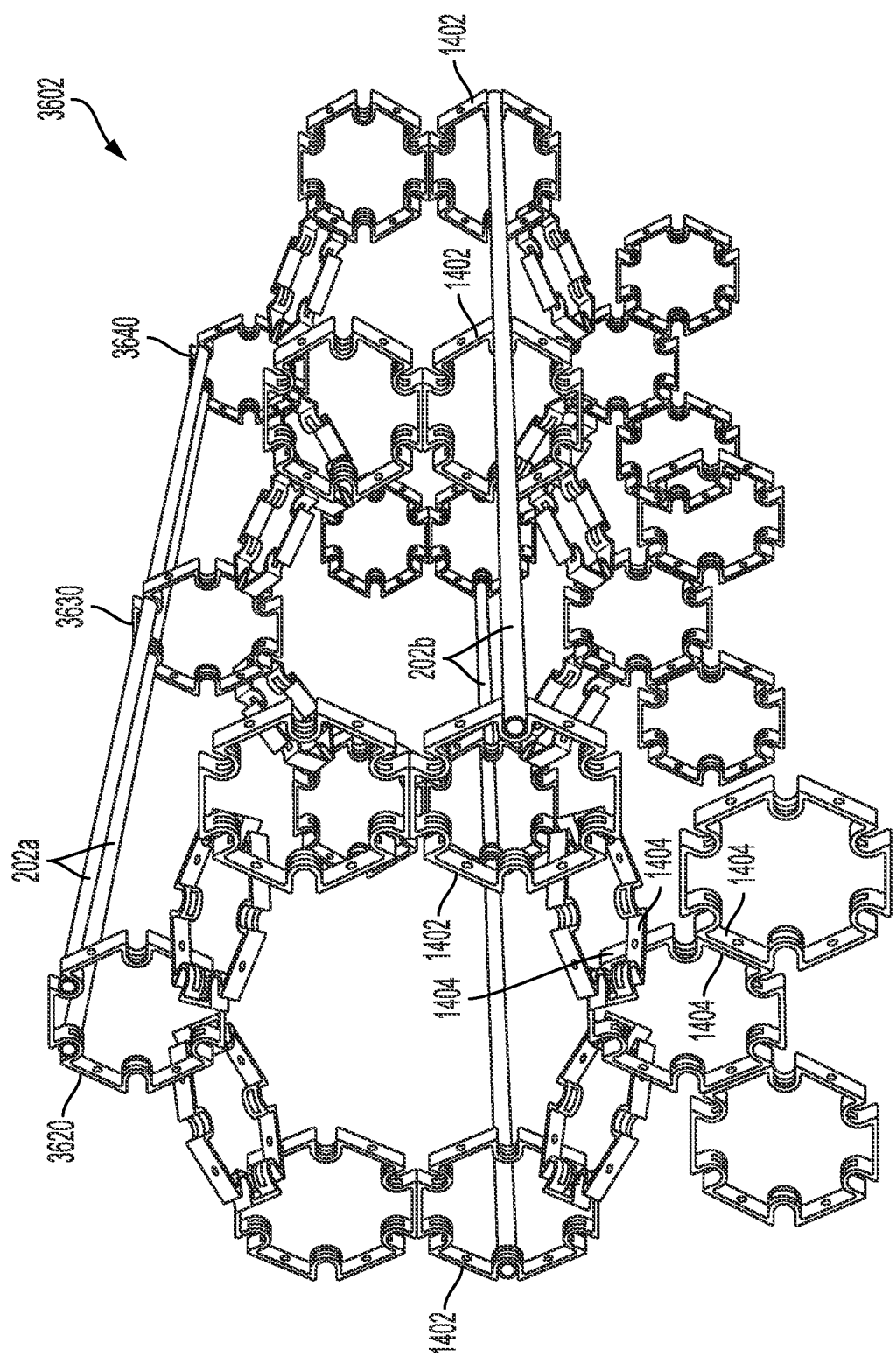
FIG. 36 shows an isometric view of a rigging apparatus 3602 in accordance with an exemplary embodiment of the present invention.

FIG. 36 shows an isometric view of a rigging apparatus 3602 including three clusters 3620, 3630, 3640, each comprising 12 connected hexagonal support pieces 1402, in accordance with an exemplary embodiment of the present invention. In embodiments, as shown in FIG. 36, the three clusters 3620, 3630, 3640 may be connected together by four parallel rod pieces 202a, 202b. For example, as shown in FIG. 36, the first cluster 3620 may be positioned at one end of these rod pieces 202a, 202b; the second cluster 3630 may be positioned substantially at the middle of these rod pieces 202a, 202b; and the third cluster 3640 may be positioned at the opposite end of these rod pieces 202a, 202b. In embodiments, as shown in FIG. 36, the rod pieces 202a, 202b may comprise two parallel rod pieces 202' of substantially equal length and two parallel rod pieces 202" of substantially equal length, wherein the length of the rod piece 202a and the length of the rod piece 202b may be different. In embodiments, as shown in FIG. 36, each cluster may include hexagonal support pieces that are connected to neighboring hexagonal support pieces at various angles. For example, as shown in FIG. 36, side members 1404 of two neighboring hexagonal support pieces 1402 may abut and be attached to each other in parallel or orthogonally (i.e., forming a cross shape). FIG. 36 shows that within each cluster of 12 connected hexagonal support pieces 1402, there are four parallel connections between side members 1404 of two neighboring hexagonal support pieces 1402 and eight orthogonal connections between side members 1404 of two neighboring hexagonal support pieces 1402. In embodiments, as shown in FIG. 36, a cluster includes at least one hexagonal support piece 1402 which is connected in parallel to at least one neighboring hexagonal support piece 1402 (i.e., their side members 1404 abut and are attached to each other in parallel) and at the same time is also connected orthogonally to at least one other neighboring hexagonal support piece 1402 (i.e., their side members 1404 abut and are attached to each other orthogonally, forming a cross shape). The rigging apparatus 3602 in FIG. 36 demonstrates versatile uses of clusters formed of a different number of hexagonal support pieces 1402 in various configurations and orientations. This versatility enables the invention to be used in many different settings to support many different objects or people.

FIGS. 5-13 and 22A-36 show just some examples of how embodiments of the present invention may be configured. This wide variety of options exemplify part of the utility of this invention in that these structures may be built to fit in many locations and support many types of structures. Other configurations not shown may be compiled in accordance with embodiments of the present invention.

The inventors have found that this invention has resulted in unexpected advantages. The ease with which the pieces are connected and disconnected makes for easy building. Furthermore, the shapes of the pieces enable many configurations which allow the user to support many different types of objects in many different space constraints. Further, the shapes of the pieces provide for significant supportive strength.

Now that embodiments of the present invention have been shown and described in detail, various modifications and improvements thereon will become readily apparent to those skilled in the art. Accordingly, the spirit and scope of the present invention is to be construed broadly and not limited by the foregoing specification.

What is claimed is:

1. A rigging system comprising:
    (a) a first hexagonal support piece comprising:
        (i) six first side members,
        (ii) six first rod clamps, each one of the rod clamps being configured to receive and hold a first rod piece and positioned between and connecting two neighboring ones of the side members, the each one of the rod clamps comprising:
            (A) a first gap open to outward from a center of the first hexagonal support piece,
            (B) a first latch configured to close the first gap at least in part to hold the first rod piece within the first gap,
            (C) a first set screw hole configured for a set screw to be inserted to tighten the first latch, and
            (D) a first rear hole configured for a screw or a bolt to be inserted toward the center of the first hexagonal support piece, and
        (iii) at least one first side hole;
    (b) a second hexagonal support piece comprising:
        (i) six second side members,
        (ii) six second rod clamps, each one of the rod clamps being configured to receive and hold a second rod piece and positioned between and connecting two neighboring ones of the side members, the each one of the rod clamps comprising:
            (A) a second gap open to outward from a center of the second hexagonal support piece,
            (B) a second latch configured to close the second gap at least in part to hold the second rod piece within the second gap,
            (C) a second set screw hole configured for a set screw to be inserted to tighten the second latch, and
            (D) a second rear hole configured for a screw or a bolt to be inserted toward the center of the second hexagonal support piece, and
        (iii) at least one second side hole;
    (c) at least one connection bolt that has a cross-section of size and shape configured to fit within a cross-section of the at least one first side hole of the first hexagonal support piece and a cross-section of the at least one second side hole of the second hexagonal support piece and extends outward therefrom,
    wherein the at least one connection bolt connects a first respective side member of the six first side members of the first hexagonal support piece to a second respective side member of the six second side members of the second hexagonal support piece such that the second hexagonal support piece is rotated with respect to the first hexagonal support piece.

2. The system of claim 1 wherein the six first side members of the first hexagonal support piece and the six second side members of the second hexagonal support piece are joined to each other at six equiangular corners.

3. The system of claim 1 wherein the at least one connection bolt is threaded and the at least one side hole is tapped to receive the at least one threaded connection bolt.

4. The system of claim 1, wherein the second hexagonal support piece is rotated ninety degrees with respect to the first hexagonal support piece and a third hexagonal support piece.

5. The system of claim 1, further comprising:
    (a) a third hexagonal support piece comprising:
        (i) six third side members,
        (ii) six third rod clamps, each one of the rod clamps being configured to receive and hold a third rod piece and positioned between and connecting two neighboring ones of the side members, the each one of the rod clamps comprising:
            (A) a third gap open to outward from a center of the third hexagonal support piece,
            (B) a first latch configured to close the third gap at least in part to hold the third rod piece within the third gap,
            (C) a third set screw hole configured for a set screw to be inserted to tighten the third latch, and
            (D) a third rear hole configured for a screw or a bolt to be inserted toward the center of the third hexagonal support piece, and
        (iii) at least one third side hole.

6. The system of claim 5, wherein the second hexagonal support piece and the third hexagonal support piece are positioned below the first hexagonal support piece.

7. The system of claim 6, wherein the third rod piece has a cylindrical cross-section.

8. The system of claim 6, wherein the third rod piece has a hexagonal cross-section.

9. The system of claim 6, wherein the third rod piece has a rectangular cross-section.

* * * * *